United States Patent
Morano, III et al.

(10) Patent No.: US 11,629,804 B1
(45) Date of Patent: Apr. 18, 2023

(54) ASYMMETRIC CLAMP FOR JOINING SANITARY FITTINGS

(71) Applicants: Carolina Components Group, Inc., Morrisville, NC (US); CLAMP PRODUCTS, LLC, Grand Rapids, MI (US)

(72) Inventors: Lawrence George Morano, III, Lakeway, TX (US); Andrew Neal Gilje, Cary, NC (US); John Hobson Cooling, Jr., Cary, NC (US); Martin Kim Mund, Reed City, MI (US); Kevin Russell Leiter, Traverse City, MI (US)

( * ) Notice: Subject to any disclaimer, the term of this patent is extended or adjusted under 35 U.S.C. 154(b) by 0 days.

(21) Appl. No.: 17/725,472

(22) Filed: Apr. 20, 2022

(51) Int. Cl.
*F16L 23/036* (2006.01)

(52) U.S. Cl.
CPC ............... *F16L 23/036* (2013.01)

(58) Field of Classification Search
CPC ......... F16L 23/036; F16L 23/04; F16L 23/06; F16L 21/06; F16L 37/06
USPC ......... 285/24, 337, 336, 363, 364, 365, 420, 285/406, 407
See application file for complete search history.

(56) References Cited

U.S. PATENT DOCUMENTS

| | | | |
|---|---|---|---|
| 2,689,141 A | 1/1952 | Kiekhaefer | |
| 2,775,806 A | 1/1957 | Love | |
| 3,563,571 A | 2/1971 | Werra | |
| 3,744,825 A | 7/1973 | Cooper et al. | |
| D236,798 S | 9/1975 | Hall | |
| 3,913,187 A | 10/1975 | Okuda | |
| 3,937,501 A | 2/1976 | Weinhold | |
| 3,979,143 A | 9/1976 | Weinhold | |
| 4,123,095 A | 10/1978 | Stehlin | |
| 4,163,571 A | 8/1979 | Nash | |

(Continued)

FOREIGN PATENT DOCUMENTS

| | | |
|---|---|---|
| EP | 3446020 A2 | 2/2019 |
| JP | 5134573 B2 | 1/2013 |

(Continued)

OTHER PUBLICATIONS

"Universal Flange Clamp", Mar. 27, 2014, YouTube.com, site visited by USPTO Jan. 26, 2023: https://www.youtube.com/watch?v=HmUZPS9D2Ew (Year:2014).

(Continued)

*Primary Examiner* — Aaron M Dunwoody
(74) *Attorney, Agent, or Firm* — Kevin E Flynn; Flynn IP Law

(57) ABSTRACT

A clamp with two segments and a process for applying a first clamp segment to a pair of flanges for adjacent fluid flow elements so that the first clamp segment is retained by the pair of flanges after application. Steps including 1) aligning a first flange with a second flange to form the pair of flanges; and 2) elastically deforming the first clamp segment to capture into the first clamp segment an arc of more than 180 degrees of the pair of flanges with the arc being sufficiently more than 180 degrees that after capture of the pair of flanges that the first clamp segment cannot be disengaged from the pair of flanges without application of sufficient force to elastically deform the first clamp segment to expand sufficiently to allow removal of the pair of flanges. Otherwise the first clamp segment is retained.

21 Claims, 18 Drawing Sheets

(56) References Cited

U.S. PATENT DOCUMENTS

| | | |
|---|---|---|
| 4,660,869 A | 4/1987 | Gabus |
| 4,693,498 A | 9/1987 | Baugh et al. |
| 4,702,499 A | 10/1987 | deRaymond et al. |
| D294,330 S | 2/1988 | Keck |
| 4,848,808 A | 7/1989 | Pannell et al. |
| 4,919,453 A | 4/1990 | Hailing et al. |
| 5,257,834 A | 11/1993 | Zeidler et al. |
| 5,470,114 A | 11/1995 | Umney et al. |
| 5,499,849 A | 3/1996 | Fend |
| 5,505,503 A | 4/1996 | Boivin |
| 5,645,303 A | 7/1997 | Warehime et al. |
| 5,782,499 A | 7/1998 | Gfrerer et al. |
| 5,837,180 A | 11/1998 | Linder et al. |
| 6,234,545 B1 | 5/2001 | Babuder et al. |
| D447,564 S | 9/2001 | Stewart, Jr. |
| 6,488,664 B1 | 12/2002 | Solomon et al. |
| 6,536,811 B1 | 3/2003 | Ranson, Jr. et al. |
| 7,201,351 B2 | 4/2007 | Stigler |
| 7,284,731 B1 | 10/2007 | Johnson et al. |
| 7,306,212 B2 | 12/2007 | Cantin |
| 7,644,960 B2 | 1/2010 | Casey, Sr. et al. |
| 7,828,335 B2 | 11/2010 | Gill |
| 7,837,239 B2 | 11/2010 | Krausz et al. |
| 8,196,971 B2 | 6/2012 | Hansen |
| 8,220,113 B2 | 7/2012 | Morton et al. |
| 8,322,755 B2 | 12/2012 | Kluss et al. |
| 8,328,457 B2 | 12/2012 | Werth |
| D695,100 S | 12/2013 | Whitaker et al. |
| 9,004,545 B2 | 4/2015 | Whitaker et al. |
| 9,151,420 B2 | 10/2015 | McKiernan |
| D749,835 S | 2/2016 | Whitaker |
| 9,334,991 B2 | 5/2016 | Weinhold |
| D770,886 S | 11/2016 | Whitaker |
| 9,618,147 B2 | 4/2017 | Krueger |
| D807,137 S | 1/2018 | Whitaker |
| 9,927,052 B1 | 3/2018 | Robillard et al. |
| D833,265 S | 11/2018 | Meola et al. |
| 10,125,906 B2 | 11/2018 | Whitaker |
| 10,197,199 B2 | 2/2019 | Fontenot |
| D850,247 S | 6/2019 | Sillitoe et al. |
| 10,352,488 B2 | 7/2019 | Barrientos |
| 10,408,371 B2 | 9/2019 | Floyd |
| 10,508,668 B2 | 12/2019 | Ikushima |
| D877,604 S | 3/2020 | Sillitoe |
| 10,746,330 B2 | 8/2020 | Hughes et al. |
| 10,859,192 B2 | 12/2020 | Whitaker |
| 11,060,637 B2 | 7/2021 | Takeda et al. |
| 11,185,907 B2 | 11/2021 | Schweizer et al. |
| D938,814 S | 12/2021 | Wickham et al. |
| D941,408 S | 1/2022 | Jones |
| 11,320,078 B2 | 5/2022 | Oba et al. |
| D954,521 S | 6/2022 | Jenney |
| 11,369,899 B2 | 6/2022 | Kuan |
| 11,441,715 B1 | 9/2022 | Buzdum |
| 2004/0159454 A1 | 8/2004 | Shibuya |
| 2005/0212291 A1 | 9/2005 | Edwards |
| 2005/0258648 A1 | 11/2005 | Newman |
| 2006/0049634 A1 | 3/2006 | Goodsel et al. |
| 2007/0024056 A1 | 2/2007 | Borland |
| 2007/0138351 A1 | 6/2007 | Wu |
| 2008/0179469 A1 | 7/2008 | Leone et al. |
| 2009/0119886 A1 | 5/2009 | Werth |
| 2009/0208277 A1 | 8/2009 | Werth |
| 2010/0132165 A1 | 6/2010 | Shor et al. |
| 2012/0126534 A1 | 7/2012 | Morton et al. |
| 2012/0227221 A1 | 9/2012 | Whitaker et al. |
| 2013/0009395 A1 | 1/2013 | Horning et al. |
| 2013/0249212 A1 | 9/2013 | McKiernan |
| 2015/0235821 A1 | 8/2015 | Madocks et al. |
| 2016/0053926 A1 | 2/2016 | Whitaker |
| 2017/0191589 A1 | 7/2017 | Floyd |
| 2017/0307116 A1 | 10/2017 | Handa |
| 2018/0156362 A1* | 6/2018 | Takeda .................... F16L 43/02 |
| 2018/0187811 A1 | 7/2018 | Scholz et al. |
| 2019/0145559 A1 | 5/2019 | Karlsson |
| 2019/0226613 A1 | 7/2019 | Schneider |
| 2020/0080675 A1 | 3/2020 | White et al. |
| 2020/0277986 A1 | 9/2020 | Ignaczak et al. |
| 2021/0247008 A1 | 8/2021 | Sillitoe et al. |
| 2021/0301952 A1 | 9/2021 | Belen et al. |
| 2022/0333721 A1 | 10/2022 | Jenney |

FOREIGN PATENT DOCUMENTS

| | | |
|---|---|---|
| JP | 2020094613 A | 6/2020 |
| JP | 4575973 B2 | 11/2020 |
| WO | 1998029679 A1 | 7/1998 |
| WO | 2002035905 A2 | 5/2002 |
| WO | 2003050445 A1 | 6/2003 |
| WO | 2006005826 A1 | 1/2006 |
| WO | 2006048086 A1 | 5/2006 |
| WO | 2009044024 A2 | 4/2009 |
| WO | 2010134771 A2 | 11/2010 |
| WO | 2013019009 A2 | 2/2013 |
| WO | 2016120223 A1 | 8/2016 |
| WO | 2019201381 A1 | 10/2019 |

OTHER PUBLICATIONS

"PharmaLok™ Series Single-Use Clamps", Apr. 30, 2014, YouTube.com, site visited by USPTO Jan. 26, 2023: https://youtube.com/watch?v=xmFA6FC0UIo (Year: 2014).

* cited by examiner

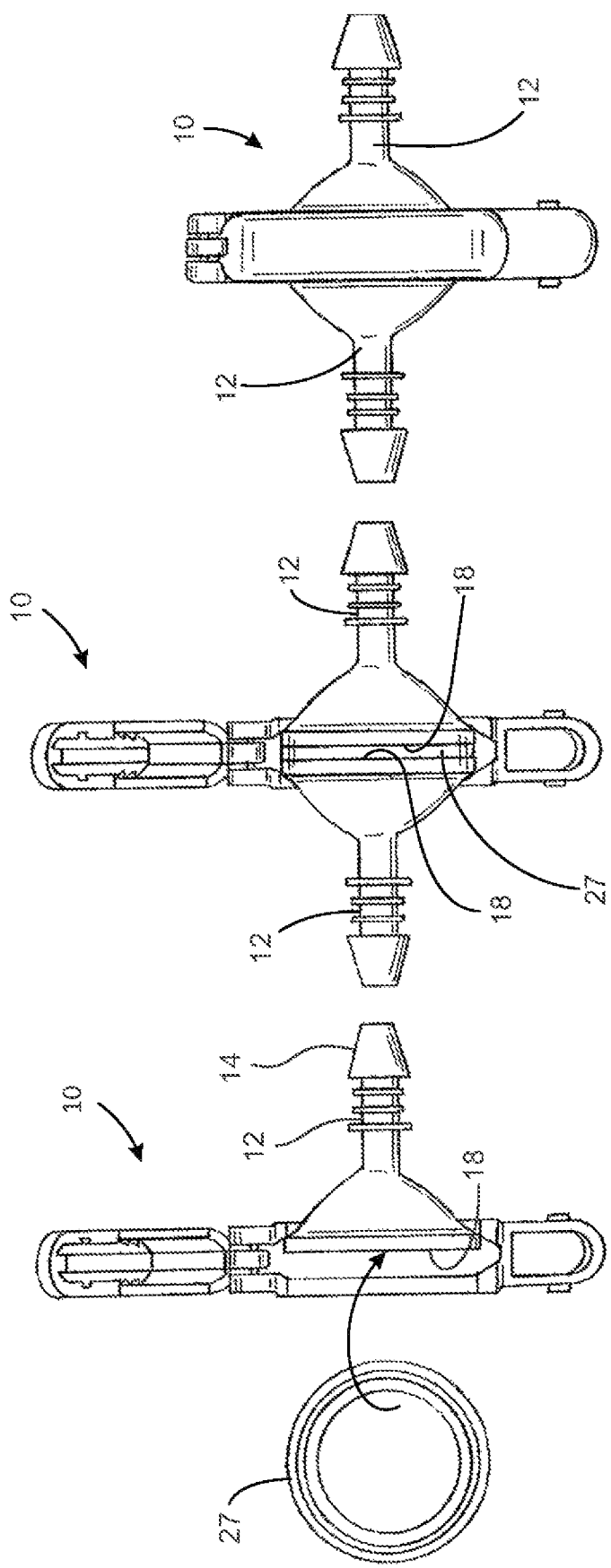

FIG. 14   2000

| 2004 | Insert gasket into groove on the face of the first flange. |
|---|---|
| 2008 | Compress a second flange to the first flange with gasket. |
| 2012 | Ensure alignment of the first flange with gasket and second flange. |
| 2016 | Squeeze together both flanges with gasket at the flanges and maintain pressure. |
| 2020 | Elastically deform the first clamp segment and receive more than 180 degrees of the pair of flanges with gasket. |
| 2024 | The user has the option of taking both hands off of the clamp as the first clamp segment of the clamp will retain the clamp on the pair of flanges with the entrapped gasket. |
| 2028 | Rotate the second clamp segment of the clamp around the hinge to close the clamp. |
| 2032 | Lock the first clamp segment to the second clamp segment of the clamp. |
| 2036 | The flange connection is now complete and secure. |
| 2040 | Optionally, a cable tie or other locking device may be used as a secondary locking mechanism to lock the clamp and keep the first clamp segment from becoming unlocked at the primary locking mechanism. |

200

200

200

200

FIG. 21
200
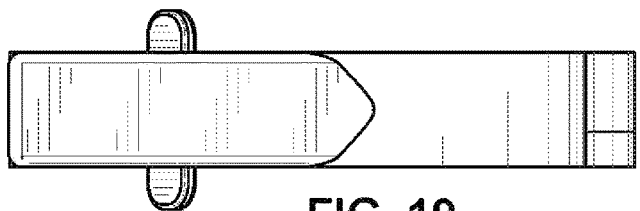
FIG. 23
200
FIG. 19
200
FIG. 24
200
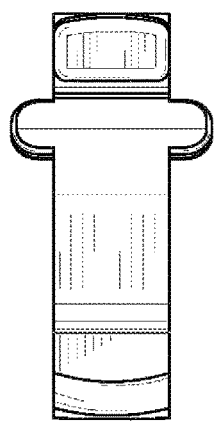 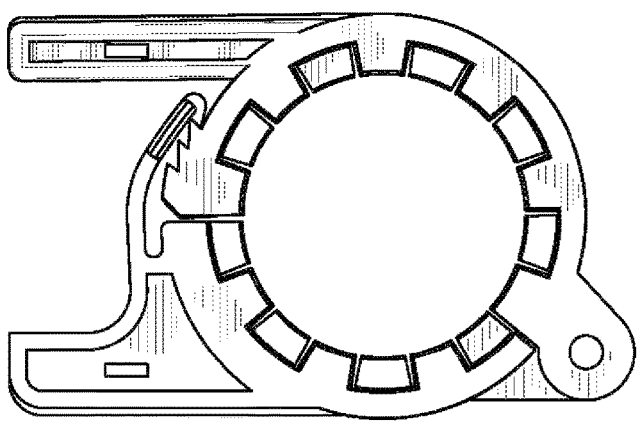 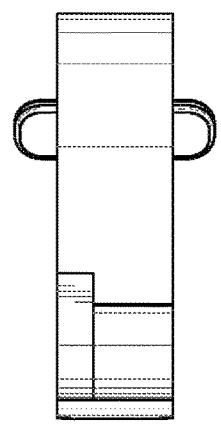
FIG. 22
200
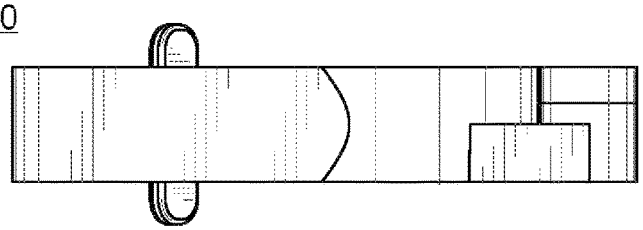
FIG. 20
200
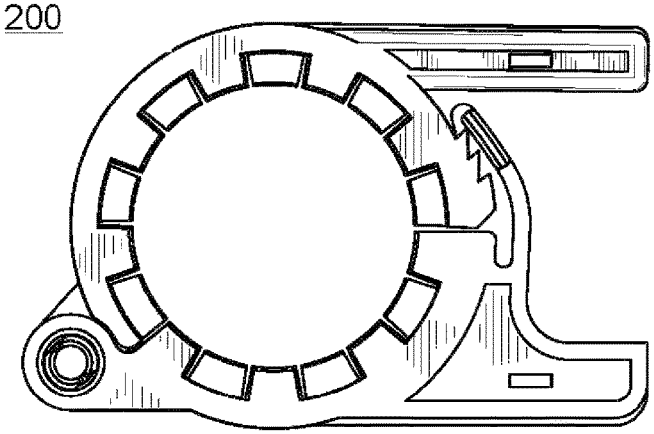

200

200

200

200

ASYMMETRIC CLAMP FOR JOINING SANITARY FITTINGS

BACKGROUND

Field of the Disclosure

This disclosure relates generally to a clamp that is used to connect two pipes by reversibly clamping a set of flanges from the first pipe and the adjacent pipe. The pipes may be tubes with inserted barbed connectors that have flanges for this purpose. The present disclosure may be used for a range of flanged connectors. The present disclosure may be used in connection with sanitary fittings inserted into tubing used in the medical, pharmaceutical, biopharmaceutical, food and beverage, or laboratory environments.

Related Art

For many years, there have been clamps which join a pair of flanges on pipes to allow for the pipes to be reversibly joined. In some instance the flanges are part of barbed connectors which are inserted into polymer tubing. Thus the clamps are retaining flanges for a pair of adjacent fluid flow elements whether the flanges are integral to the pipes or part of a connectors inserted into the pipes or tubes.

U.S. Pat. No. 8,328,457 to Werth for a Sanitary Clamp is representative of the prior art. In FIG. 1 a sanitary connector 12 with a barbed connector 14 is adapted to engage with a tube (not shown here). The sanitary connector 12 has a flange 18 that is used with a clamp to join two adjacent sanitary connectors 12 or a sanitary connector 12 with an end cap (not shown here). The sanitary connector 12 is adapted to receive an O-ring 27 which is compressed between adjacent sanitary connectors 12.

FIG. 2 shows a pair of sanitary connectors 12 with an O-ring 27 sandwiched between them. A clamp 10 is shown in the open position and engaging a portion of the circumference of the two adjacent flanges 18. The clamp 10 may be made from a polymer that is suitable for use in the relevant food, medical, pharmaceutical, or other industry.

FIG. 3 shows the pair of sanitary connectors 12 captured by the closed clamp 10.

FIG. 4 shows top right perspective view of a clamp 10. The clamp has a first clamp piece 20 and a second clamp piece 40 that are designed to receive substantially the same arc lengths of the flanges 18. The first clamp piece 20 is always joined by hinge 60 to second clamp piece 40. First clamp piece 20 may be reversibly joined to second clamp piece 40 by locking mechanism 50. A variety of conventional solutions may be used for the hinge 60 or the locking mechanism 50. Notice that the sloped walls 84 and 88 and corresponding sloped walls on the near side act to work with corresponding slopes on the the two flanges 18. This correspondence causes a solid final assembly of the clamp 10 and the entrapped O-ring seal 27 as the circumferences of the flanges 18 move to be fully seated within the first clamp piece 20 and the second clamp piece 40.

FIG. 5 shows a front view of clamp 10 without the pair of adjacent sanitary connectors 12. Notice that first arc 94 in first clamp piece 20 is not more than 180 degrees. Likewise, second arc 98 in the second clamp piece 40 is not more than 180 degrees. A problem with the prior art clamps 10 is that when the first clamp piece 20 is applied by a user trying to manipulate two flanges 18 and the captured O-ring 27, that releasing the clamp 10 while arranging the sanitary connectors 12 or the tubing will tend to allow the clamp 10 to come off of the pair of flanges 18. An unmet need in the prior art is a clamp 10 that could have a first clamp piece 20 applied to a pair of flanges 18 and then stay engaged with the pair of flanges 18 when the user releases the first clamp piece 20. Releasing the first clamp piece 20 allows the user to grab the second clamp piece 40 and rotate the second clamp piece 40 around the hinge 60 to engage the locking mechanism 50.

Before the pair of flanges 18 are fully seated in a locked clamp 10 there is a tendency of the pair of flanges and not yet compressed O-ring 27 to want to assume an expanded position. This tendency to expand combined with the sloped walls (such as 84 and 88 and the corresponding walls) tends to push the first clamp piece 20 out of engagement with the flanges 18 and the weight of the second clamp piece 40 then pulls the clamp off the flanges 18 and onto the floor. In many applications, if a clamp 10, an end cap, or an O-ring 27 hits the floor in a clean room, then those components are considered contaminated and cannot be used. The user must stop the process of joining two adjacent flanges 18 and will need to go obtain a new clamp 10 or a new O-ring 27.

One of skill in the art will appreciate that the same sort of problem would exist if the user initially engaged the second clamp piece 40 with the pair of flanges 18.

The ongoing existence of this problem was acknowledged in U.S. Pat. No. 8,220,113 to Morton et al. for a smart clamp device for connecting tubing.

Vocabulary

A, An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Gne and Gnes.

To avoid the awkward he/she and his/her or the potentially confusing singular use of they and their, this application uses the gender-neutral pronoun-gne, the possessive pronoun-gnes, reflexive pronoun-gneself and the object form-gnerm.

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway-thus the word "substantially" may prevent avoidance of infringement by minor changes that do not affect the results sought to be accomplished.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Some aspects of the teachings of the present disclosure may be expressed as a clamp for holding a pair of flanges in alignment for use in a fluid flow system. The clamp having a first clamp segment with a first hinge portion at a first hinge end and a first locking portion at a first locking end.

The clamp also having a second clamp segment with a second hinge portion at a second hinge end and a second locking portion at a second locking end. The first hinge portion engaged with the second hinge portion to form a hinge connecting the first clamp segment to the second clamp segment. The first locking portion and the second locking portion adapted to form a reversible locking engagement so that the clamp can be moved from an unlocked status to a locked status.

The first clamp segment is sized to allow a user to elastically deform to expand a first distance from the first hinge portion to the first locking portion to receive an arc of more than 180 degrees of perimeter of each of the pair of flanges.

The arc received is sufficiently more than 180 degrees of perimeter such that after receipt a removal force must be applied to elastically deform the first clamp segment to expand the first distance to allow for removal of the pair of flanges from the first clamp segment such that absent application of the removal force, the first clamp segment stays on the pair of flanges after release by the user. The arc may be between 190 and 245 degrees and will frequently be between 220 and 240 degrees.

The clamp constructed so that the pair of flanges are received between a first set of teeth on a front side of the first clamp segment and a second set of teeth on a back side of the first clamp segment and the first set of teeth and the second set of teeth are aligned so that for any particular point along a perimeter of the pair of flanges, the pair of flanges is in contact with one of a set of three choices:

the first set of teeth and not the second set of teeth;
the second set of teeth and not the first set of teeth; and
neither the first set of teeth nor the second set of teeth.

Other aspects of the disclosure may be summarized as a process for applying a first clamp segment to a pair of flanges for adjacent fluid flow elements so that the first clamp segment is retained by the pair of flanges. The process steps include:

aligning a first flange with a second flange so that a centerline of the first flange is the centerline of the second flange to form the pair of flanges;

elastically deforming the first clamp segment to capture into the first clamp segment an arc of more than 180 degrees of the pair of flanges with the arc being sufficiently more than 180 degrees that after capture of the arc of the pair of flanges, the first clamp segment cannot be disengaged from the pair of flanges without application of force to elastically deform the first clamp segment to expand sufficiently to allow a diameter of the pair of flanges to exit the first clamp segment while the first clamp segment is held in an elastically deformed state. Thus, absent application of that force, the first clamp segment is retained by the pair of flanges.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 1 shows a sanitary connector 12 with a barbed connector 14 is adapted to engage with a tube. FIG. 2 shows a pair of sanitary connectors 12 with an O-ring 27 sandwiched between them.

FIG. 3 shows the pair of sanitary connectors 12 captured by the closed clamp 10.

FIG. 14 contains improved process 2000 for applying a clamp to a pair of flanges.

FIG. 19 is a front elevation view of clamp 200.

FIG. 20 is a rear elevation view of clamp 200.

FIG. 21 is a top plan view of clamp 200.

FIG. 22 is a bottom plan view of clamp 200.

FIG. 23 is a left side elevation view of clamp 200.

FIG. 24 is a right side elevation view of clamp 200.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 6:
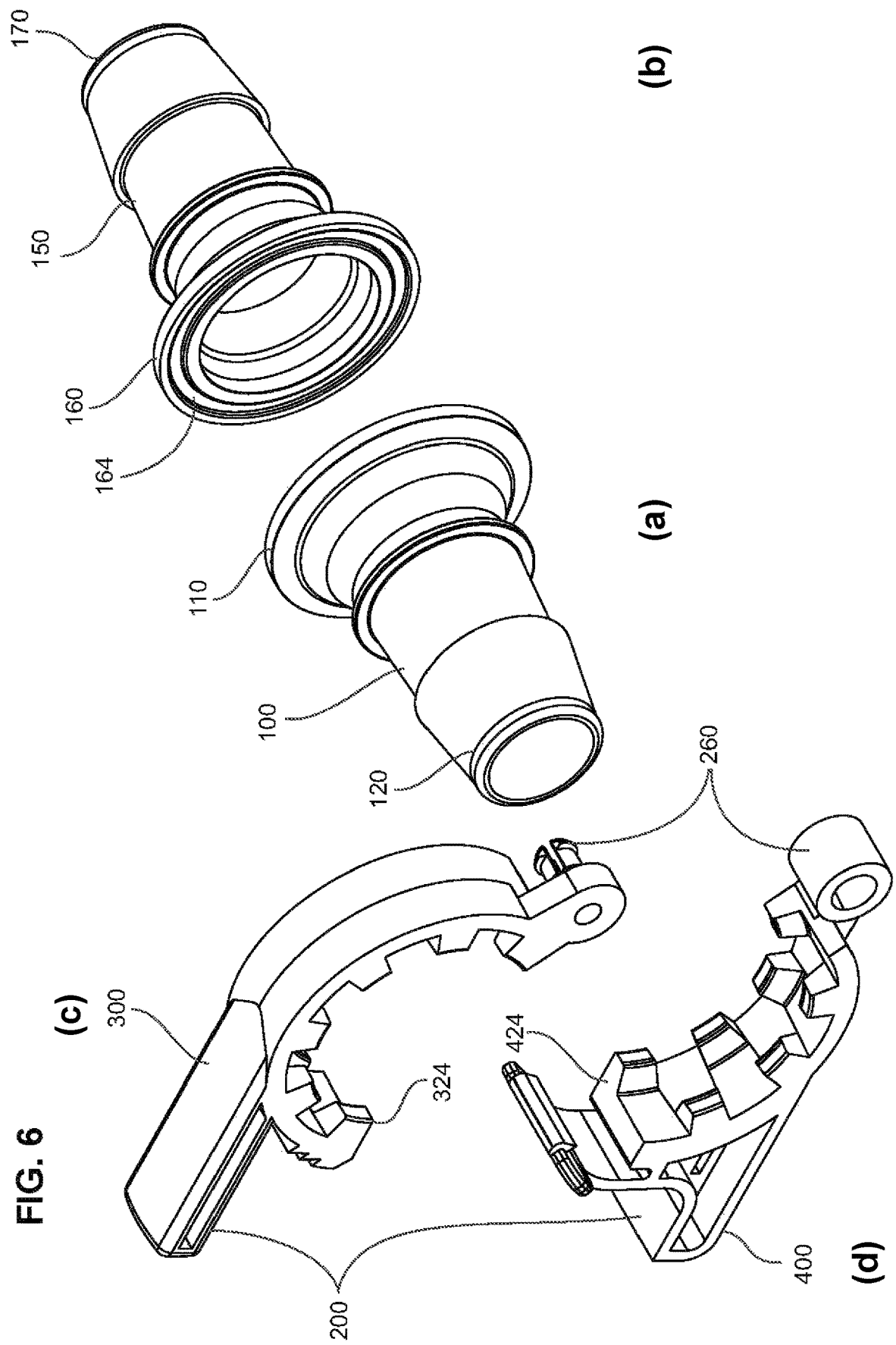
FIG. 6 is a top right perspective exploded view of the components that are assembled in FIG. 7 with FIG. 6(a) showing a first sanitary connector 100 with flange 110, with FIG. 6(b) showing a second sanitary connector 150 with flange 160, with FIG. 6(c) showing a first clamp segment 300 of a clamp 200 and with FIG. 6(d) showing a second clamp segment 400 of the clamp 200.
Figure 7:
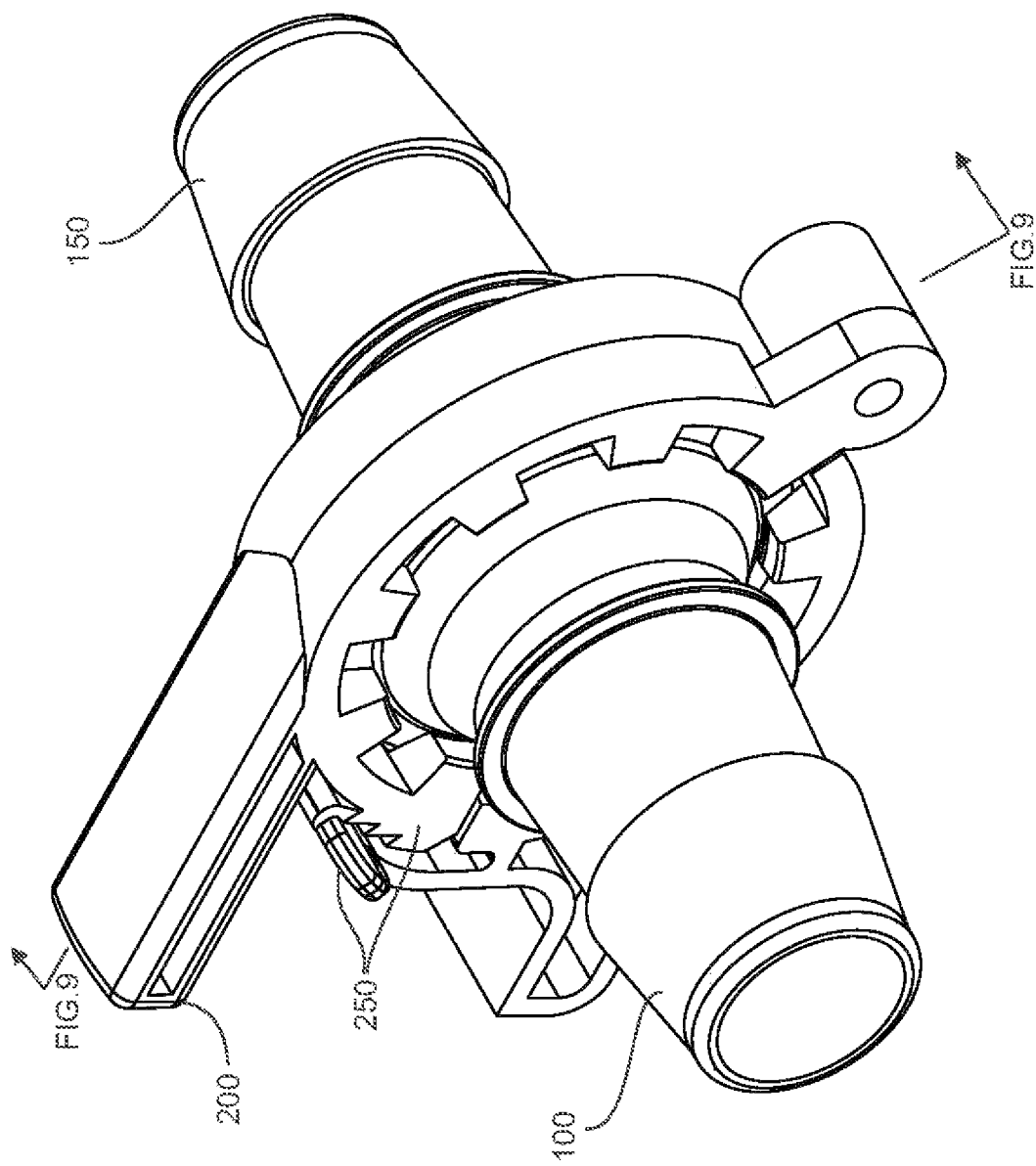
FIG. 7 is a top right perspective view of the same components as shown in the exploded view of FIG. 6.

FIG. 6 is a top right perspective exploded view of the components that are assembled in FIG. 7 with FIG. 6(a) showing a first sanitary connector 100 with flange 110, with FIG. 6(b) showing a second sanitary connector 150 with flange 160, with FIG. 6(c) showing a first clamp segment 300 of a clamp 200 and with FIG. 6(d) showing a second clamp segment 400 of the clamp 200. Visible in flange 160 is groove 164 to receive an O-ring (not shown). One of skill in the art will appreciate that flange 110 will have an analogous groove. As will be described in more detail, portions of first clamp segment 300 and second clamp segment 400 combine to form a hinge 260.

End 120 of first sanitary connector 100 and end 170 of second sanitary connector 150 are adapted for insertion into tubing (not shown). Thus, a first end of tubing engaged with end 120 can be placed in fluid communication with a second end of tubing engaged with end 170 of the second sanitary connector 150 when the flanges 110 and 160 are held by closed clamp 200.

FIG. 7 is a top right perspective view of the same components as shown in the exploded view of FIG. 6. First sanitary connector 100 is abutting second sanitary connector 150 and held in place by closed clamp 200 using locking mechanism 250.

Figure 8:
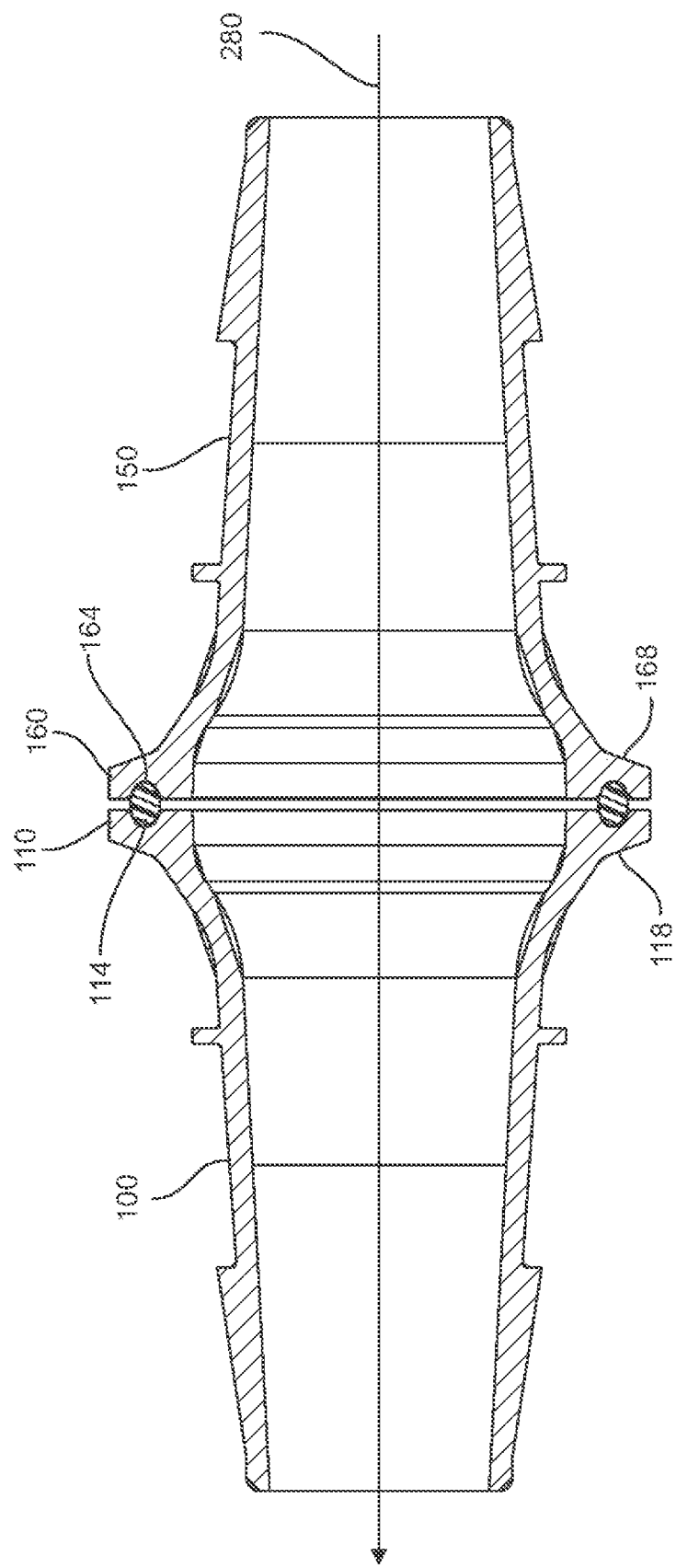
FIG. 8 is a cross section of the flange 110 of the first sanitary connector 100 abutting the flange 160 of the second sanitary connector 150.

FIG. 8 is a cross section of the flange 110 of the first sanitary connector 100 abutting the flange 160 of the second sanitary connector 150. Grooves 114 and 164 hold an O-ring (not shown here) that is compressed by the clamp 200 to seal the flow path 280.

Figure 9:
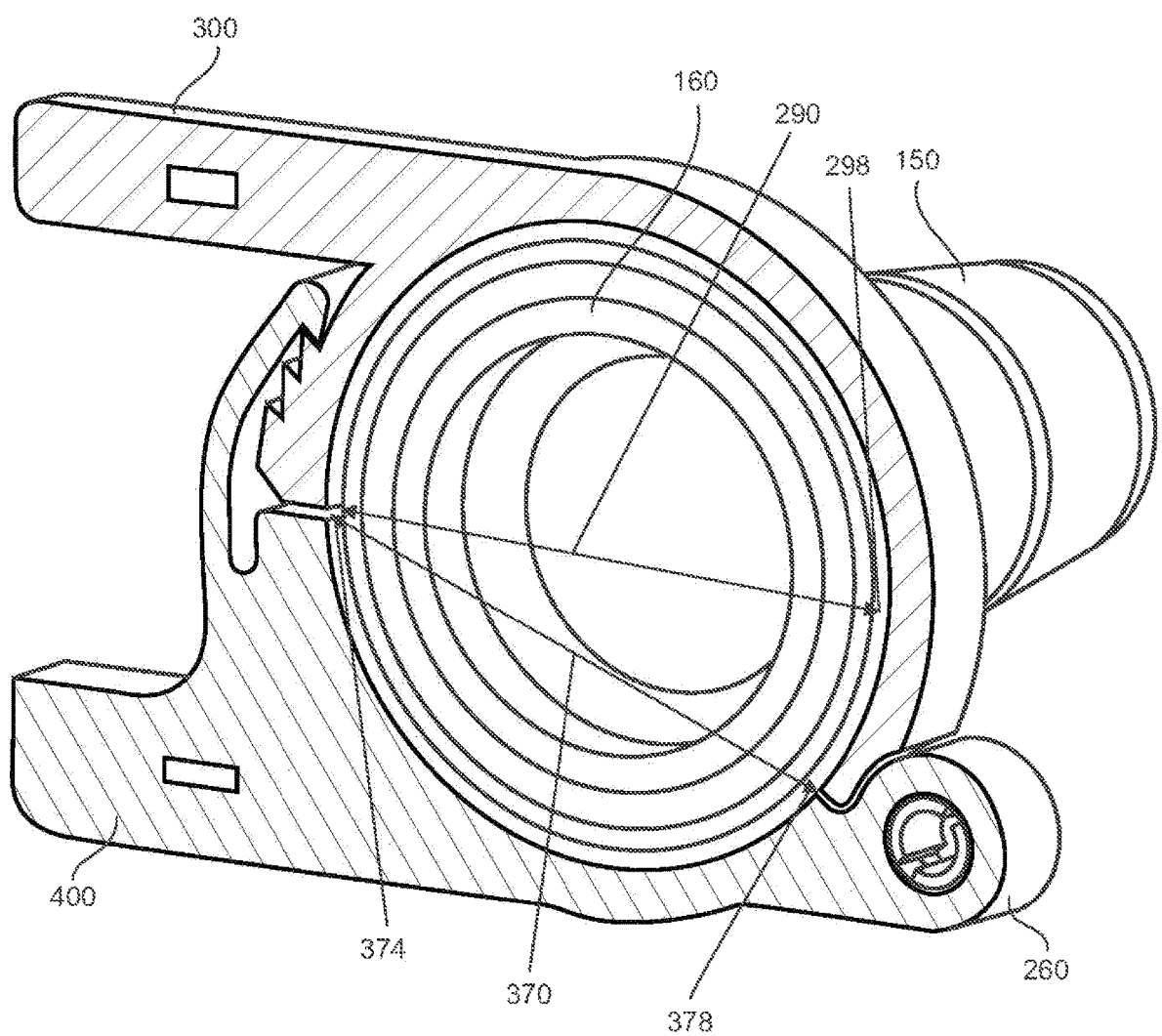
FIG. 9 is a cross section of FIG. 7 taken along the midline of the clamp 100. In this view, one can see that the endpoint 374 and endpoint 378 of first clamp segment 300 form a line 370 that is well below a diameter 290 of the flange 160.

FIG. 9 is a cross section of FIG. 7 taken along the midline of the clamp 100. In this view, one can see that the endpoint 374 and endpoint 378 of first clamp segment 300 form a line 370 that is well below a diameter 290 of the flange 160. Thus, when first clamp segment 300 is applied to the pair of flanges 110 and 160, the end points 374 and 378 flex outwards as the first clamp segment 300 is made of a polymer that elastically deforms to receive the pair of flanges 110 and 160. The endpoint 374 and endpoint 378 are below the midpoint of the centerline of the flange 160 and thus capture an arc of the perimeter of the pair of flanges that is more than 180 degrees of the perimeter of the flanges 110 and 160. That means that unlike prior art designs that had segments of not more than 180 degrees which embraced an arc of slightly less than 180 degrees of the perimeters of the flanges before being fully seated, there is no easy way for the elastically deformed first clamp segment 300 to return to a non-deformed state. Movement relative to the pair of flanges 110 and 160 would require energy to newly elastically deform first clamp segment 300 in order to expand to allow endpoints 374 and 378 to be bigger than flange diameter 290.

A careful observer will note that endpoint 378 is clearly not as far to the right as diameter endpoint 298 in FIG. 9. Thus, first clamp segment 300 after being forced upon flanges 110 and 160 so as to elastically deform first clamp segment 300 will not move from engagement with flanges 110 and 160 without the application of force to increase the elastic deformation of first clamp segment 300 so that the endpoints 374 and 378 of first clamp segment 300 are forced to be wider than flange diameter 290.

A user may thus force first clamp segment 300 upon a pair of flanges 110 and 160 and let go of first clamp segment 300 without any concern that first clamp segment 300 will disengage from flanges 110 and 160 and possibly fall to the floor.

The user may view the alignment of the first sanitary connector 100 relative to the second sanitary connector 150 and associated connected tubing before rotating second clamp segment 400 around hinge 260 to engage a locking mechanism 250 (FIG. 7).

Note that it may seem natural for a user to apply the first clamp segment 300 to the top of the pair of flanges 110 and 160, this is not required. A user may apply the first clamp segment 300 to the bottom portion of the pair of flanges 110 and 160 as the effect of the elastic deformation of the first clamp segment 300 is sufficient to retain the segment 300 against the pull of gravity. The user may wish to do so in order to have the locking mechanism 250 on a particular side of the pair of flanges 110 and 160. For example, the locking mechanism 250 of the clamp 200 may have a secondary locking feature that receives a cable tie or other item to preclude inadvertent or unauthorized openings of the clamp 200. Placing this feature in a readily viewable position would be desirable versus placing the lock conformation feature in a hard to view position.

One will note that unlike prior art clamps where a first clamp segment and a second clamp segment were roughly symmetric in that both engage approximately 180 degrees of the flange circumferences, the present disclosure teaches the use of a clamp with a first portion that is definitely asymmetric with the second clamp segment so that the first clamp segment may engage with sufficiently more than 180 degrees of circumference of the pair of flanges that it will require the application of force to remove the engaged first portion from the pair of flanges as the first portion will require elastic deformation to expand in order to disengage from the pair of flanges.

Figure 10:
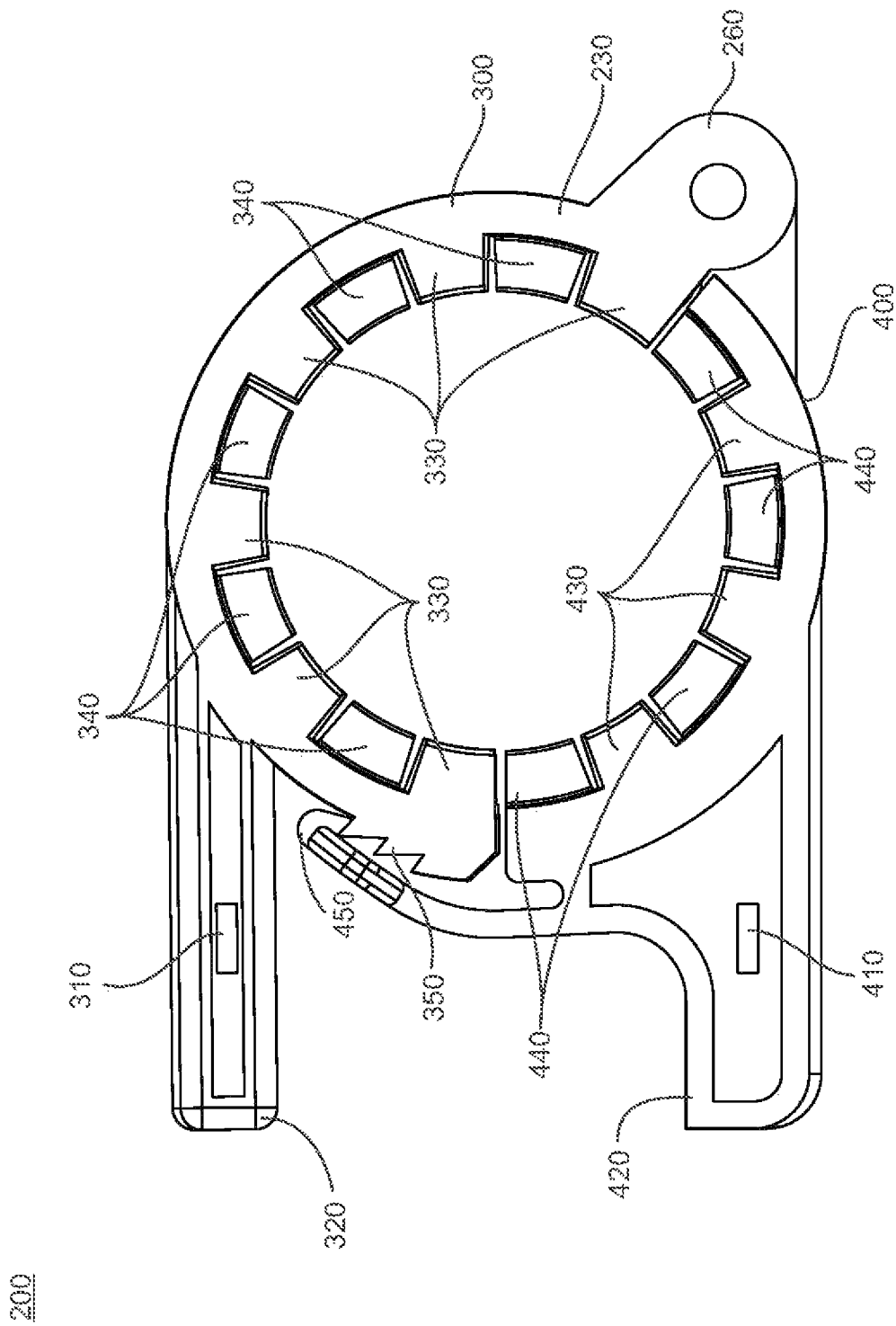
FIG. 10 is a front view of clamp 200.

FIG. 10 is a front view of clamp 200. First clamp segment 300 permanently joined to second clamp segment 400 via hinge 260. A set of teeth 350 on the locking end of first clamp segment 300 may be reversibly engaged with a pawl arm 450 on second clamp segment 400 to form a locking engagement. Those of skill in the art will appreciate that many other locking mechanisms may be used instead of a pawl arm and set of teeth. Likewise, those of skill in the art will appreciate that the teeth may be placed on the second clamp segment 400 and the pawl arm may be placed on the first clamp segment 300.

A passageway 310 in the handle 320 of the first clamp segment 300 and passageway 410 in the handle 420 of the second clamp segment 400 may be used to add a second layer of security to a locked clamp 200 by running a cable tie through the pair of passageways (310, 410) so that the cable tie would need to be cut in order to release the locking mechanism. Those of skill in the art will recognize that other fastening devices could be used in place of the cable tie.

Visible in FIG. 10 are a set of sloped teeth that receive and compress the pair of flanges 110 and 160 (FIG. 8). First clamp segment 300 has six front side teeth 330 that start on the front side 230 of clamp 200. First clamp segment 300 has five back side teeth 340 that start on the back side 240 of clamp 200.

Second clamp segment 400 has only three front side teeth 430 that start on the front side 230 of clamp 200. Second clamp segment 400 has four back side teeth 440 that start on the back side 240 of clamp 200.

Figure 4:
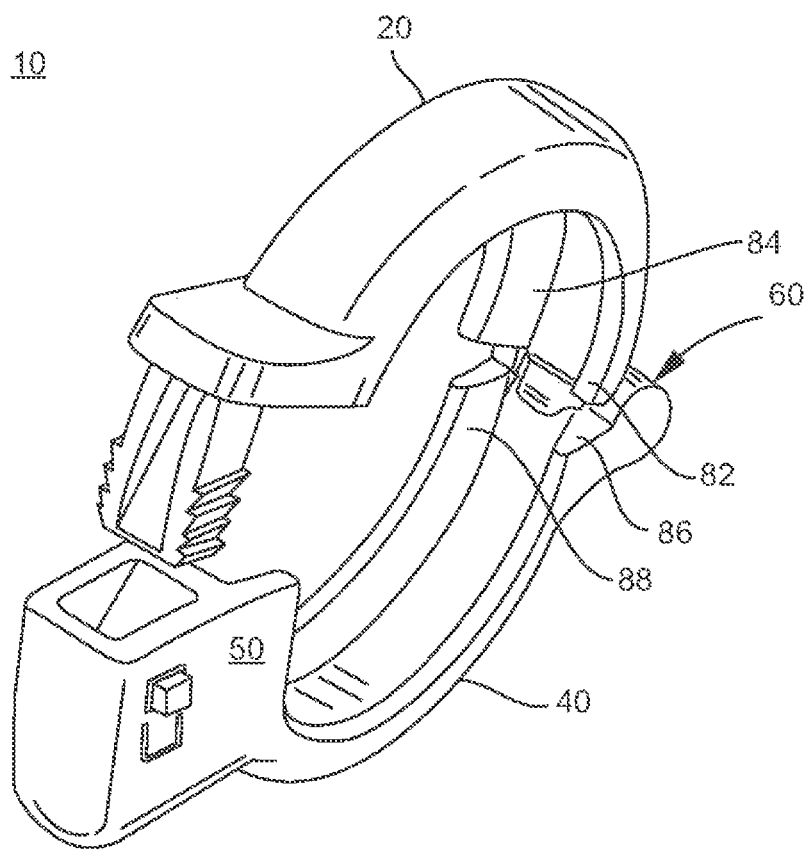
FIG. 4 shows top right perspective view of a clamp 10.
Figure 5:
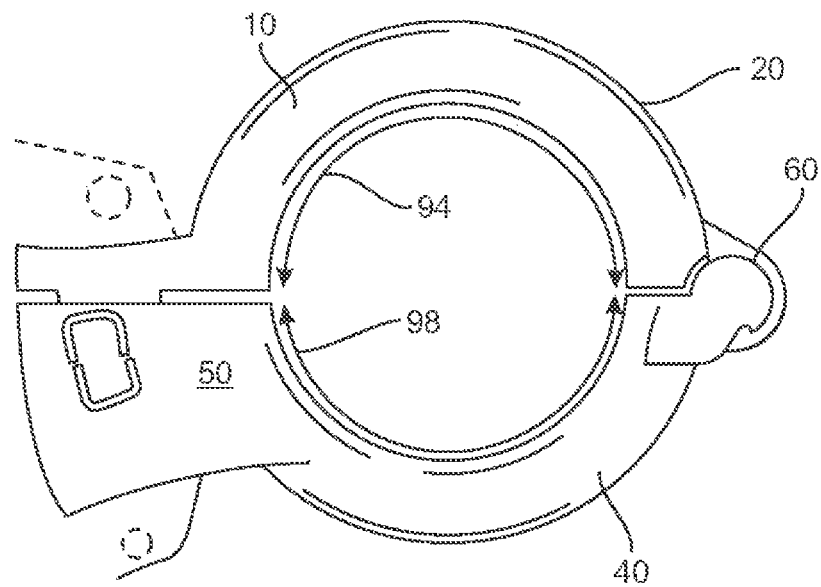
FIG. 5 shows a front view of clamp 10 without the pair of adjacent sanitary connectors 12.

The use of a series of teeth and gaps is in contrast to the prior art choice of continuous sloped walls as shown in FIG. 4 discussed above.

The spacing and width of the teeth are design choices. There is not a requirement that the width of the teeth used in the first clamp segment 300 be the same as the width of the teeth in the second clamp segment 400. The number of teeth per segment will be a function of the size of the clamp and the width of the teeth and may often have different numbers of teeth than shown in this figure.

For the sake of facilitating production of first clamp segment 300 and second clamp segment 400 using plastic injection molding, it has been found to be useful to have the teeth on the front side 230 be matched with gaps on the back side 240 and the teeth on the back side 240 be matched with gaps on the front side 230.

More specifically, the use of teeth in accordance with the teachings of the present disclosure allow for the production of parts without the need for "actions". Action is a term of art for a variety of ways to allow for parts to be injected molded even when the part shape does not fit into a simple two-piece mold of core and cavity. More precisely, when the part shape would not release from a simple two-piece mold of core and cavity. Actions are used for parts that required undercuts such as snaps, latches, side ports, some through holes, barb fittings and a range of other common features. While various actions such as cams, lifters, sliders, unscrewing, collapsible core and others can help alter the shape of the mold to allow the part to be released, these actions add to the cost and complexity of the mold.

Even with the creative use of actions, it would not be possible using conventional techniques to have a first clamp segment 300 that extends to receive more than 180 degrees of the flanges without the use of the teeth taught in this application-even with the use of conventional actions in injection molding.

Figure 11:
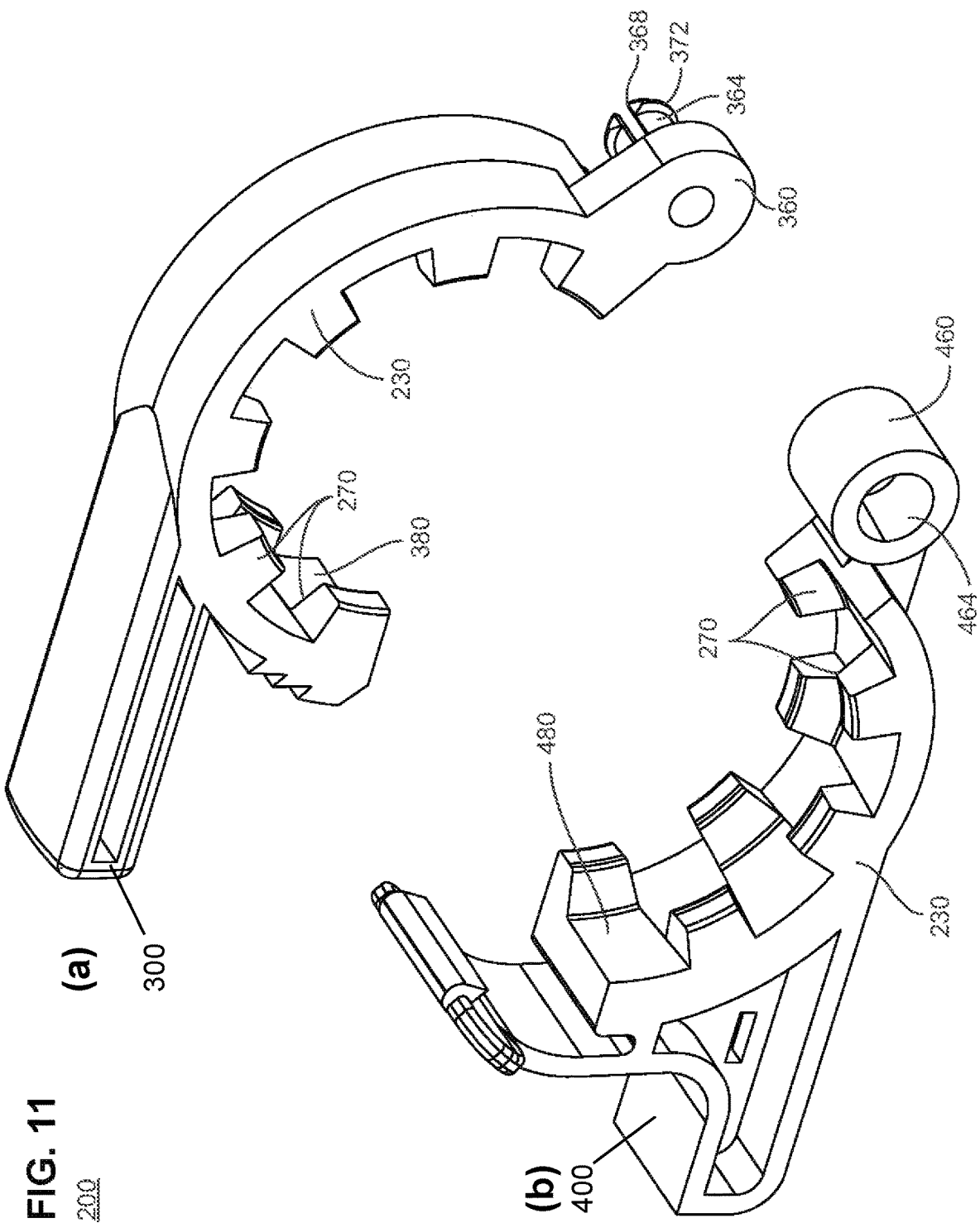
FIG. 11 is a front, top, right side perspective view of clamp 200 before first clamp segment 300 (FIG. 11(a)) is engaged with second clamp segment 400 (FIG. 11(b)) at clamp hinge 260.

FIG. 11 is a front, top, right side perspective view of clamp 200 before first clamp segment 300 (FIG. 11(a)) is engaged with second clamp segment 400 (FIG. 11(b)) at clamp hinge 260.

Figure 12:
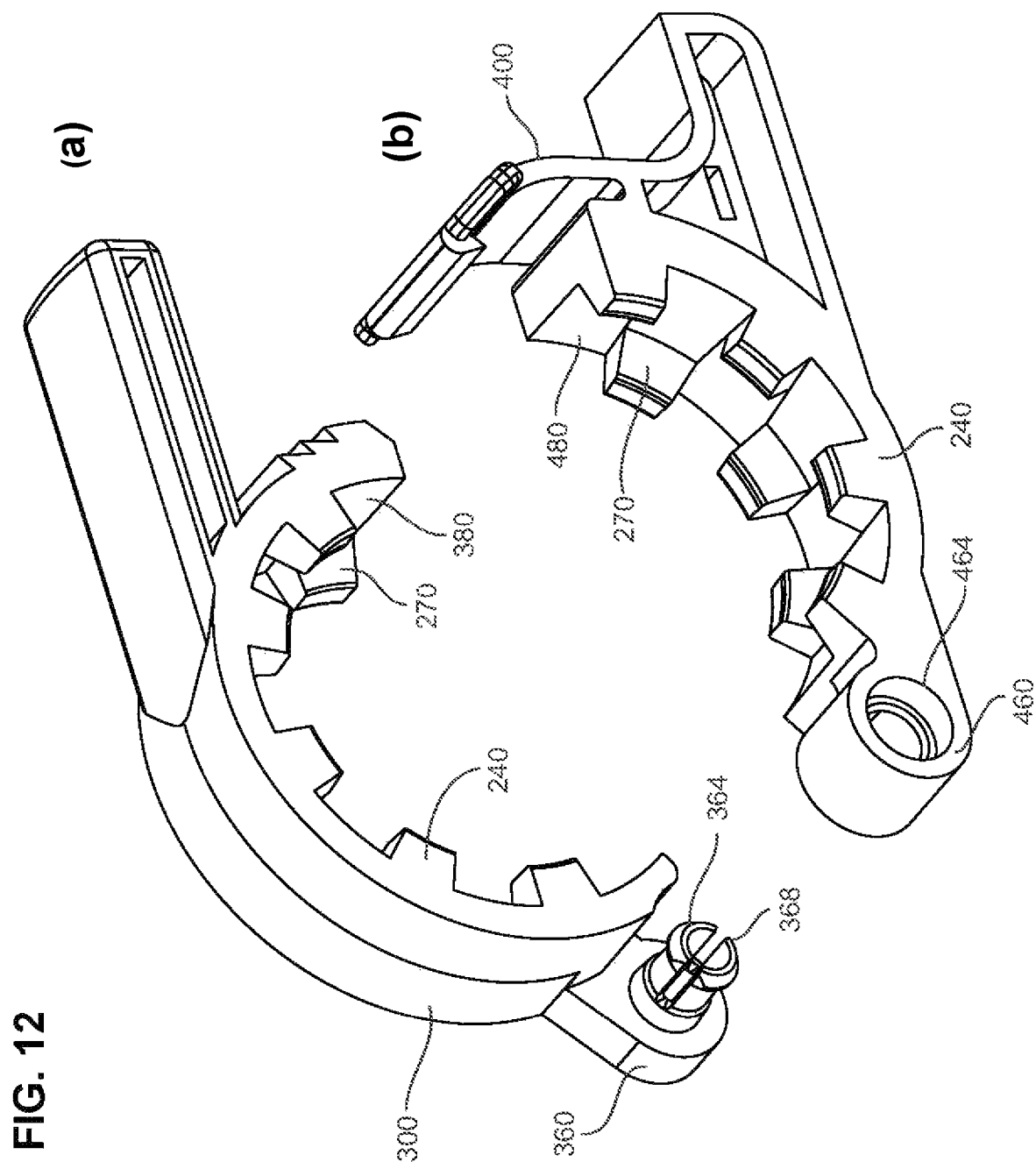
FIG. 12 is a rear, top, left side perspective view the first clamp segment 300 (FIG. 12(a)) and the second clamp segment 400 (FIG. 12(b)) of FIG. 11.

FIG. 12 is a rear, top, left side perspective view the first clamp segment 300 (FIG. 12(a)) and the second clamp segment 400 (FIG. 12(b)) of FIG. 11.

One of skill in the art viewing FIG. 11 and FIG. 12 will recognize that split head 364 of the hinge portion 360 of first clamp segment 300 may be temporarily elastically compressed radially inward while inserted through the through hole 464 of hinge portion 460 of second clamp segment 400. After the distal end 368 emerges sufficiently from the through hole 464, the split head 364 extends radially outward to engage flange 372 and preclude inadvertent withdrawal of split head 364 from the through hole 464. Those of skill in the art will recognize this as a snap fit hinge pin with a hinge pin on the first clamp segment 300 and a receiving ring on the second clamp segment 400. The components of the snap fit hinge could be reversed relative to the disclosed drawings so that the through hole 464 is on the first clamp segment 300 rather than the second clamp segment 400. This would create a snap fit hinge pin with a hinge pin on the second clamp segment 300 and a receiving ring on the first clamp segment 400.

One of skill in the art will appreciate that other hinge mechanisms may be substituted for the specific hinge mechanism using a snap fit hinge pin shown in this disclosure.

Visible in both FIG. 11 and FIG. 12 are a set of sloped faces 270 on the teeth in the first clamp segment 300 and second clamp segment 400. These slope faces 270 gradually decrease the space for the pair of flanges 110 and 160 (FIG. 8) as the first clamp segment 300 and the second clamp segment 400 are tightened by the locking mechanism. The amount of tightening is not the full amount of the slope of the sloped faces 270 as the pair of flanges 110 and 160 have their own sloped surfaces 118 and 168 (FIG. 8). Between the teeth is a flange receiving arc 380 on first clamp segment 300 and a second shorter flange receiving arc 480 on second clamp segment 400. Thus, in contrast to the prior art, clamp 200 has substantial asymmetry between the length in degrees of the flange receiving arc 380 and the length in degrees of flange receiving arc 480 in order to allow the flange receiving arc 380 to be substantially more than 180 degrees in length.

Plastic Injection Molding

The clamp 200 may be created using any feasible manufacturing process that provides for components with sufficient capacities for elastic deformation to retain the first clamp segment 300 on the pair of flanges 110 and 160. To the extent that a choice is made to have the first clamp segment 300 made as one unitary piece then it has been found useful to employ the set of teeth and gaps as shown in this disclosure. Further, it has been found that for the sake of facilitating production of first clamp segment 300 and second clamp segment 400 using plastic injection molding, it has been found to be useful to have the teeth on the front side 230 be matched with gaps on the back side 240 and the teeth on the back side 240 be matched with gaps on the front side 230.

Attempting to make the first clamp segment 300 that extends for more than 180 degrees of the circumferences of the flanges 110 and 160 while using the prior art continuous sloped walls would have a part that wraps back on itself and would be die locked. One of skill in the art looking at FIG. 10, FIG. 11, and FIG. 12 will appreciate that first clamp segment 300 could be lifted straight out of a mold by moving the front side 230 straight back.

Preferred Materials

The first clamp segment 300 and the second clamp segment 400 may be made of any suitable material that provides suitable capacity for elastic deformation and thus holding power of the first clamp segment 300 when applied to a pair of flanges 110 and 160. A sample of a suitable material is polyketone which is a high-performance thermoplastic polymer. Other suitable materials include polypropylene or nylon.

Process of Use

In order to better appreciate the advances provided by the current design, it is useful to review the prior art process for applying a clamp to a pair of flanges.

Figure 13:
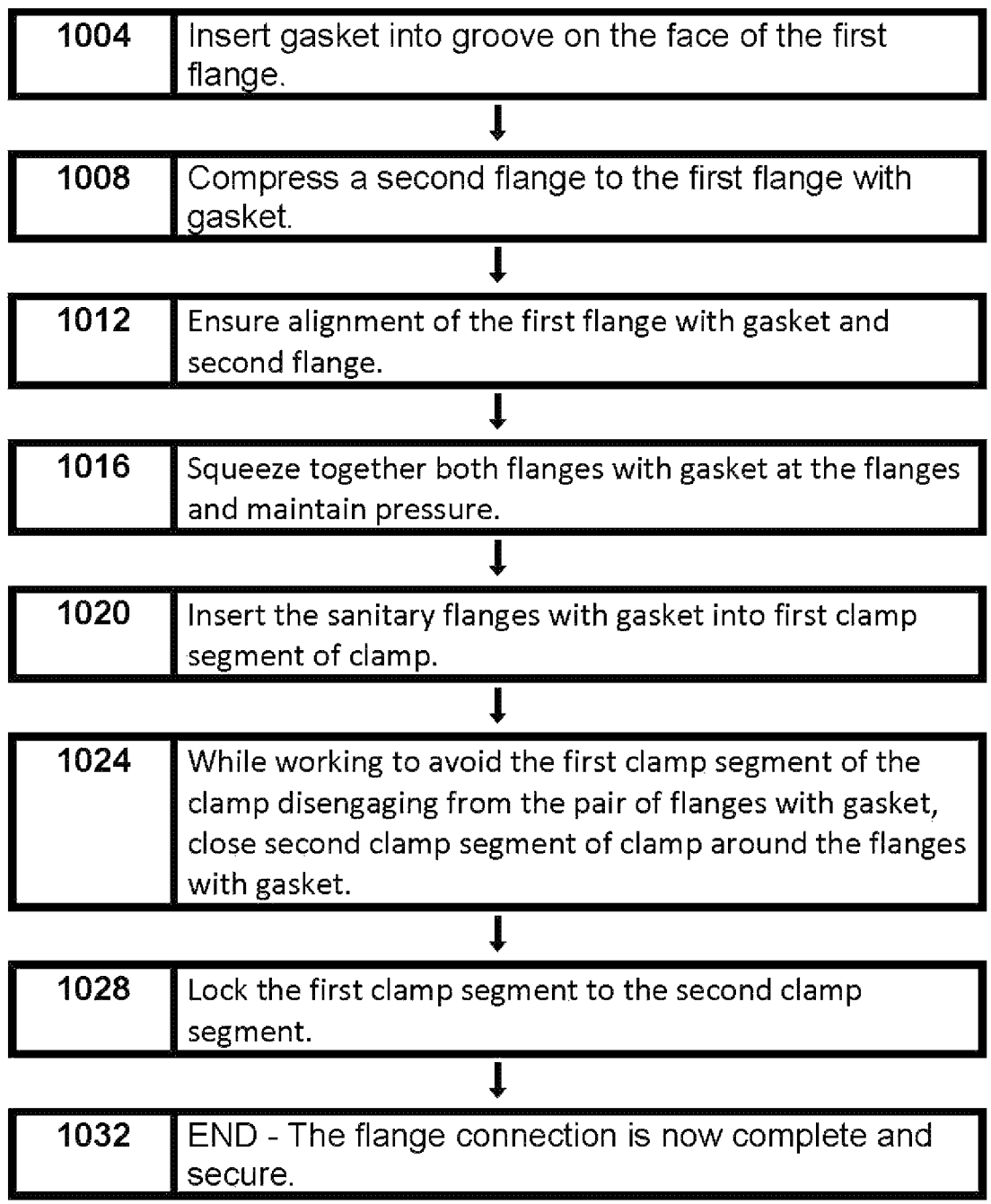
FIG. 13 shows prior art process 1000 for applying a clamp to a pair of flanges.

FIG. 13 shows prior art process 1000 for applying a clamp to a pair of flanges.

Step 1004 Insert gasket into groove on the face of the first flange.

Step 1008 Compress a second flange to the first flange with gasket.

Step 1012 Ensure alignment of the first flange with gasket and second flange.

Step 1016 Squeeze together both flanges with gasket at the flanges and maintain pressure.

Step 1020 Insert the flanges with gasket into first clamp segment of clamp.

Step 1024 While working to avoid the first clamp segment of the clamp disengaging from the pair of flanges with gasket, close second clamp segment of clamp around the flanges with gasket.

Step 1028 Lock the first clamp segment to the second clamp segment using rachet mechanism (or other locking mechanism).

Step 1032 END-The flange connection is now complete and secure.

FIG. 14 contains improved process 2000 for applying a clamp to a pair of flanges. The first four steps are not changed from process 1000.

Step 2004 Insert gasket into groove on the face of the first flange.

Step 2008 Compress a second flange to the first flange with gasket.

Step 2012 Ensure alignment of the first flange with gasket and second flange.

Step 2016 Squeeze together both flanges with gasket at the flanges and maintain pressure.

Step 2020 Elastically deform the first clamp segment and receive more than 180 degrees of the pair of flanges with gasket. Those of skill in the art will appreciate that this step requires an elastic deformation of the first clamp segment of the clamp to allow the first clamp segment to temporarily increase in mouth width to allow the ends of the first section of the clamp to pass over the diameter of the pair of flanges and then spring back from the elastic deformation once past the maximally wide cross section (the diameter) of the pair of flanges.

Step 2024 The user has the option of taking both hands off of the clamp as the first clamp segment of the clamp will retain the clamp on the pair of flanges with the entrapped gasket.

Step 2028 Rotate the second clamp segment of the clamp around the hinge to close the clamp.

Step 2032 Lock the first clamp segment to the second clamp segment of the clamp. This may be done using a ratchet mechanism using a pawl arm 450 and a set of teeth 350 or through another locking mechanism.

Step 2036 The flange connection is now complete and secure.

Step 2040 Optionally, a cable tie or other locking device may be used as a secondary locking mechanism to lock the clamp and keep the first clamp segment from becoming unlocked at the primary locking mechanism.

ALTERNATIVES and VARIATIONS.

Locking Mechanism.

The figures showed a locking mechanism with a pawl arm is on the second clamp segment and the set of teeth is on the first clamp segment. Those of skill in the art will appreciate that the clamp could be made with a locking mechanism with a pawl arm is on the first clamp segment and the set of teeth is on the second clamp segment.

Those of skill in the art will appreciate that any locking mechanism used in any prior art flange clamps could be employed in a clamp using the teachings of the present disclosure as the teachings of the present disclosure is independent of the specific locking mechanism employed.

The prior art contains many suitable locking mechanisms. Some of the many examples include:
U.S. Pat. No. 5,645,303 to Warehime et al. for Compact Pipe Coupling Device.
U.S. Pat. No. 9,004,545 to Whitaker et al. for Clamp for Sanitary Fitting.
U.S. Pat. No. 7,284,731 to Johnson et al. for a Sanitary Clamp.
U.S. Pat. No. 8,328,457 to Werth for Sanitary Clamp.
U.S. Pat. No. 9,151,420 to McKiernan for a Tube or Pipe Clamp.
U.S. Pat. No. 10,125,906 to Whitaker for Reusable Clamp with Latch Release Arm for Connecting Conduit Sections and Associated Methods.
U.S. Pat. No. 10,408,371 to Floyd for a Cam Lever Clamp for Sanitary Fittings.
U.S. Pat. No. 10,508,668 to Ikushima for Pipe-Connecting Clamp.
U.S. Pat. No. 10,859,192 to Whitaker for Reusable Claim with Latch Release Arm for Connecting Conduit Sections and Associated Methods.
European Patent Publication EP 3 446 020 to White et al. for An Assembly Comprising a Clamp and a Tamper Evident Cover.

Rather than needlessly extend this document with descriptions of these locking mechanisms the documents in the above list ("lock examples") are incorporated by reference.

Note while one of skill in the art will appreciate that a clamp that can be reversibly locked and unlocked may be a popular choice, a multi-cycle locking mechanism is not required in order to use the teachings of this disclosure. A single-use locking mechanism may be used. A single-use locking mechanism is one where upon locking engagement, the process of unlocking destroys a portion of the locking mechanism so that the locking mechanism cannot be used a second time. In some use cases, this is desirable as it makes it clear that a clamp has been opened and closed a second time.

Hinges.

In order to show the snap fit hinge pin that is a suitable selection as a hinge, the hinge pin needed to be shown on one of the two clamp segments and the receiving ring needed to be shown on the other of the two clamp segments. As note above and appreciated by those of skill in the art, the particular choice illustrated within this figure set is not limiting as the hinge pin and receiving ring could have been placed on the opposite clamp segments.

While for purposes of enablement, a particular hinge type was illustrated, those of skill in the art will appreciate that this is one of many hinges that might be selected by a designer using the teachings of the present disclosure and this hinge choice is not limiting.

The set of documents incorporated by reference above as the "lock examples" also provides documentation of a variety of hinge solutions that may be used. Those of skill in the art will appreciate that a hinge shown in one of the "lock examples", or another hinge known in the art, may be used in a sanitary clamp that uses teachings from the present disclosure. Those of skill in the art will recognize the use of the hinge pin/rivet and the living hinge within the set of "lock example" documents.

Those of skill in the art will appreciate that a first hinge portion on a first clamp segment and a second hinge portion on a second clamp segment may be the two parts of a living hinge for a single piece clamp with a living hinge.

Flange Size.

The present disclosure is for a clamp that can be scaled for use with flanges with a diameter of 0.5 inches to about 5 inches. Specifically, some of the flanges expected to be used with this type of clamp range from 0.9840 inches to 4.675 inches of outer diameter. This is not limiting. Those of skill in the art will appreciate that the teachings of the present application can be used with a variety of flange sizes so long as a non-negligible force must be applied to elastically deform the first clamp segment to release the first clamp segment from the pair of engaged flanges. It is possible that a nanoscale clamp engaging with flanges of nanoscale diameters may not operate within the teachings of this disclosure but for non-nanoscale flanges, the teachings should apply.

Range of Captured Flange Perimeters.

One of skill in the art will appreciate that a clamp using the teachings of the present disclosure to retain a first clamp segment on a pair of flanges as the first clamp segment would need to be elastically deformed to become wide enough to release the trapped will work with a range of geometries. An important parameter is the arc length in degrees of the captured perimeters of the pair of flanges. As noted above, the arc length would need to exceed 180 degrees. The figures used in this disclosure have a captured arc length of about 220 degrees.

The range of viable arc lengths is a function of the diameter of the flanges. Bigger flanges require more elastic deformation of the clamp to allow the flanged to become engaged or disengaged with the first clamp segment.

The range of viable arc lengths is a function of the mechanical properties of the material used for the clamp and the clamp geometry such as thickness. A clamp that is easily elastically deformed may be pulled off the pair of flanges by the weight of the second clamp segment. This would lead designers towards an arc length well in excess of 180 degrees. Conversely, a clamp that is very difficult to elastically deform may drive a design choice towards 180 degrees so as to minimize the need for large exertion of force. A clamp made of stainless steel might need to be very close the 180 degree lower limit.

It is believed that a range of 220 to 240 degrees of arc length will be appropriate for most clamps made from plastic injected polymers currently found in sanitary clamps. It is believed that clamps made from polymers could have as little as 190 degrees of arc length and reliably allow the first clamp segment to be engaged with the pair of flanges without a need to hold the clamp. It is believed that going much beyond 245 degrees of arc length would require such a large force to elastically deform the first clamp segment that such a clamp would be undesirable for a user that is applying clamps for hours.

Use Beyond Sanitary Connectors.

The present application had a focus on the use of the clamp with a pair of sanitary connectors or a sanitary connector and an end cap. The title of the document reflects this focus as this is an important use case as the user is gloved and the consequences of the clamp or the gasket hitting the floor are severe. However, the teachings of the present disclosure may be used to bind flanges for other fluid connections used in industries that do not require clean room conditions. Users benefit from being able to release the first clamp segment without fear of the clamp segment falling to the ground whether or not such a fall would be deemed to contaminate the clamp.

Clean Views.

It can be useful to include a set of clean views of the clamp 200 without the distraction of lead lines and many element numbers. A set of clean views is provided.

Figure 15:
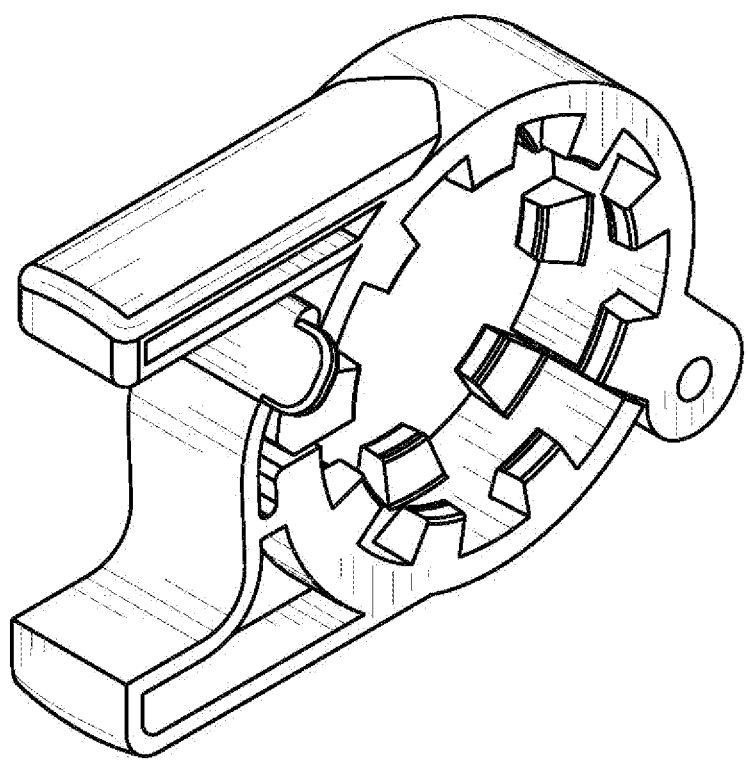
FIG. 15 is a top, left, front perspective view of clamp 200.

FIG. 15 is a top, left, front perspective view of clamp 200.

Figure 16:
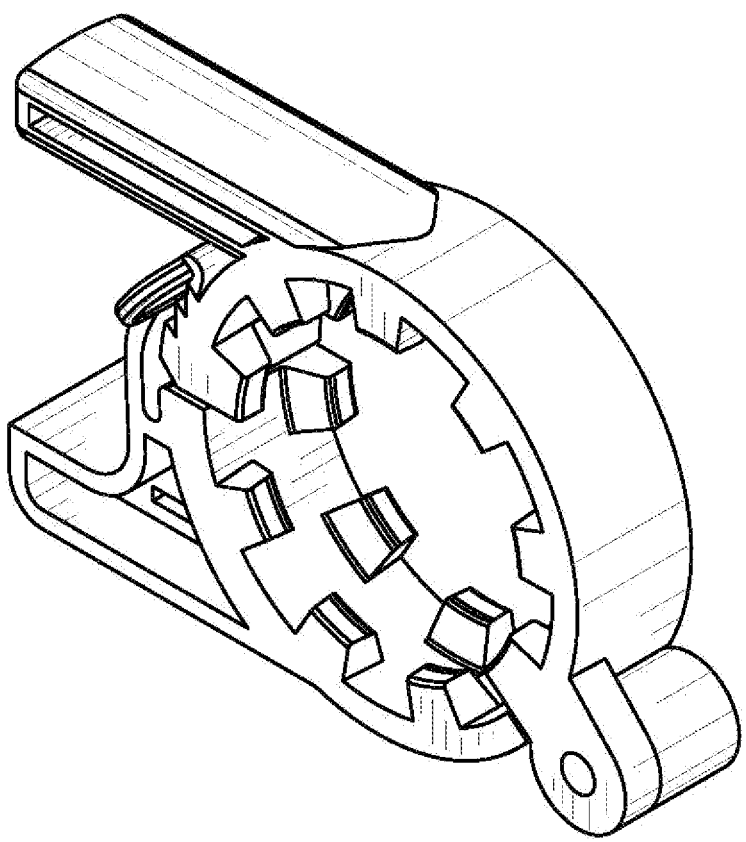
FIG. 16 is a top, right, front perspective view of clamp 200.

FIG. 16 is a top, right, front perspective view of clamp 200.

Figure 17:
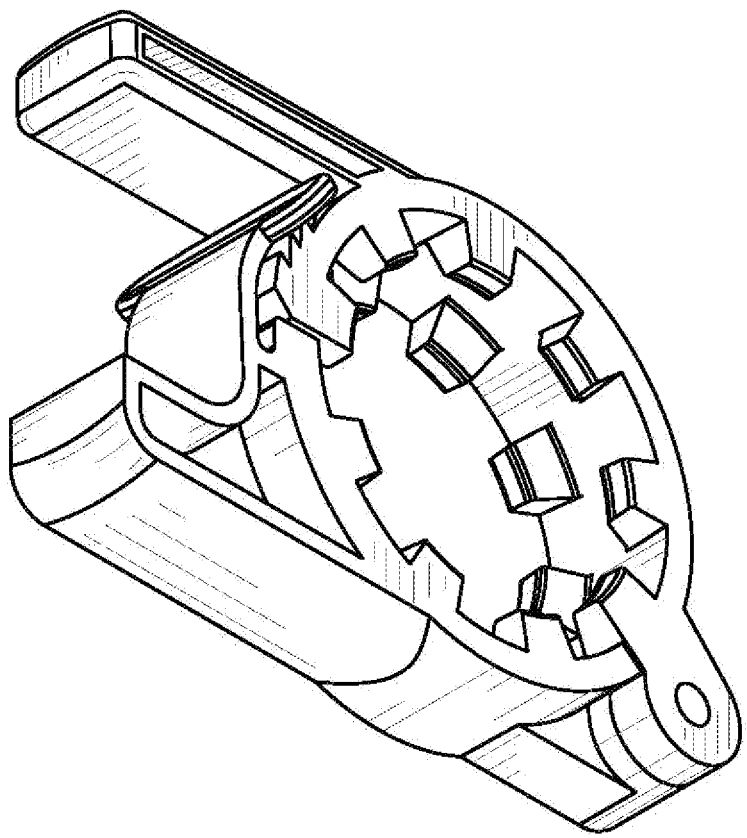
FIG. 17 is a bottom, left, front perspective view of clamp 200.

FIG. 17 is a bottom, left, front perspective view of clamp 200.

Figure 18:
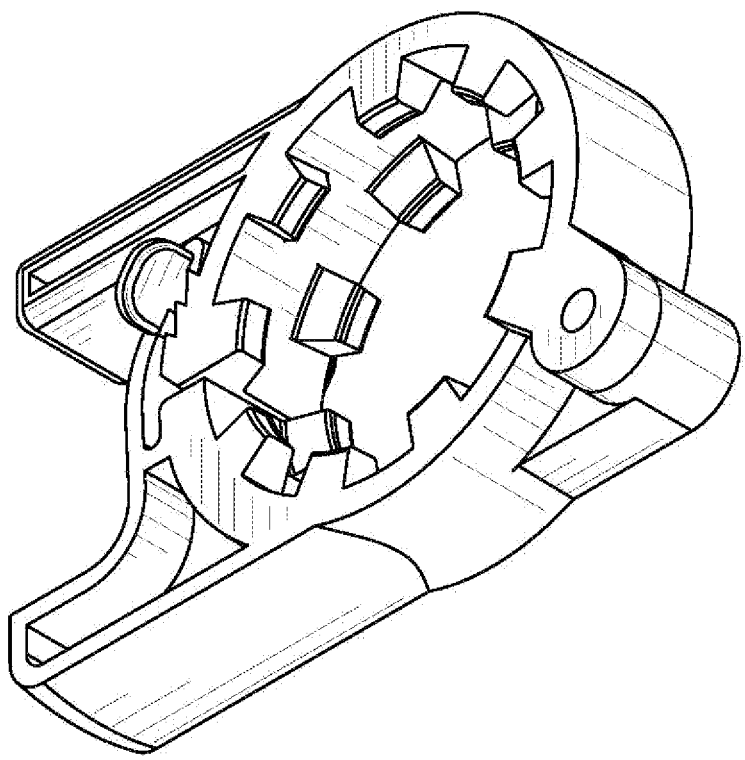
FIG. 18 is a bottom, right, front perspective view of clamp 200.

FIG. 18 is a bottom, right, front perspective view of clamp 200.

FIG. 19 is a front elevation view of clamp 200.

FIG. 20 is a rear elevation view of clamp 200.

FIG. 21 is a top plan view of clamp 200.

FIG. 22 is a bottom plan view of clamp 200.

FIG. 23 is a left side elevation view of clamp 200.

FIG. 24 is a right side elevation view of clamp 200.

Figure 25:
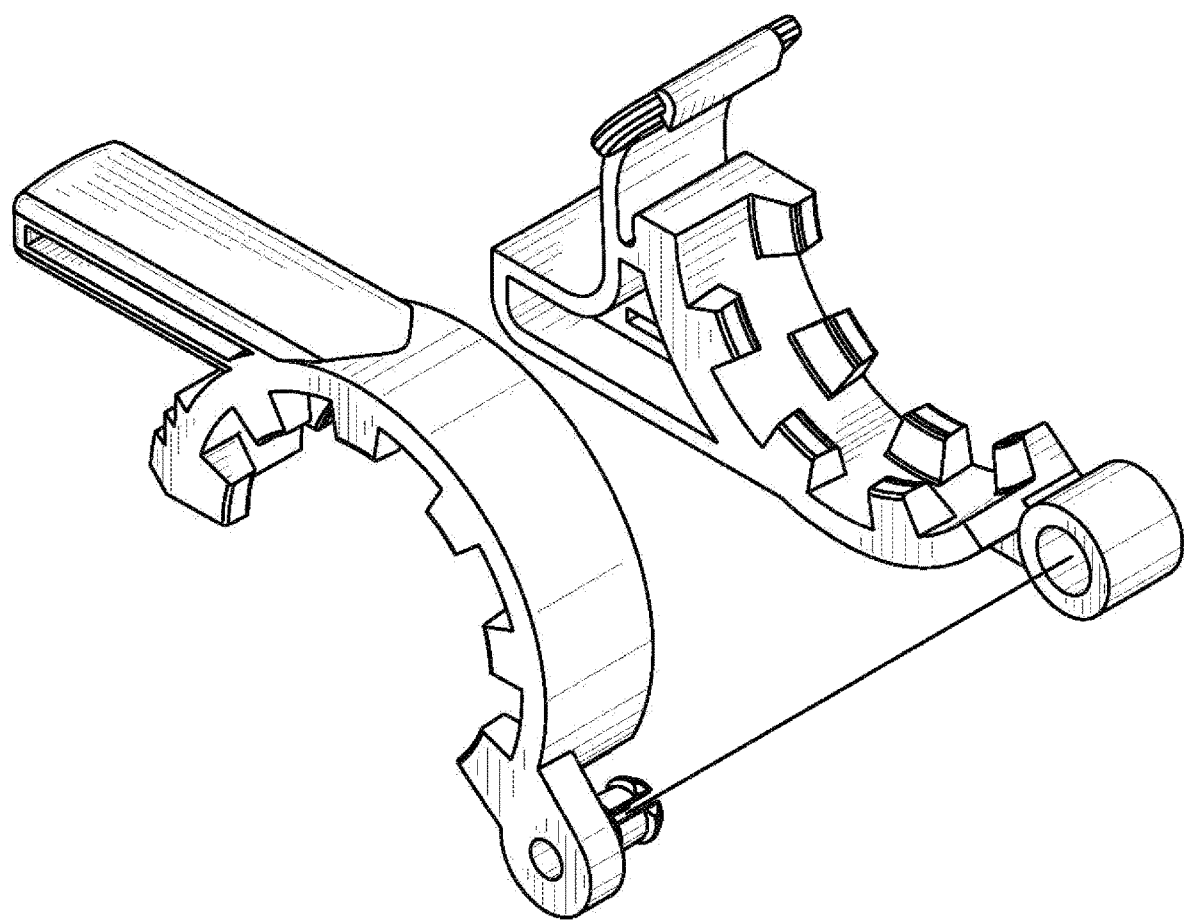
FIG. 25 is a top, right, front exploded perspective view of clamp 200.

FIG. 25 is a top, right, front exploded perspective view of clamp 200.

Figure 26:
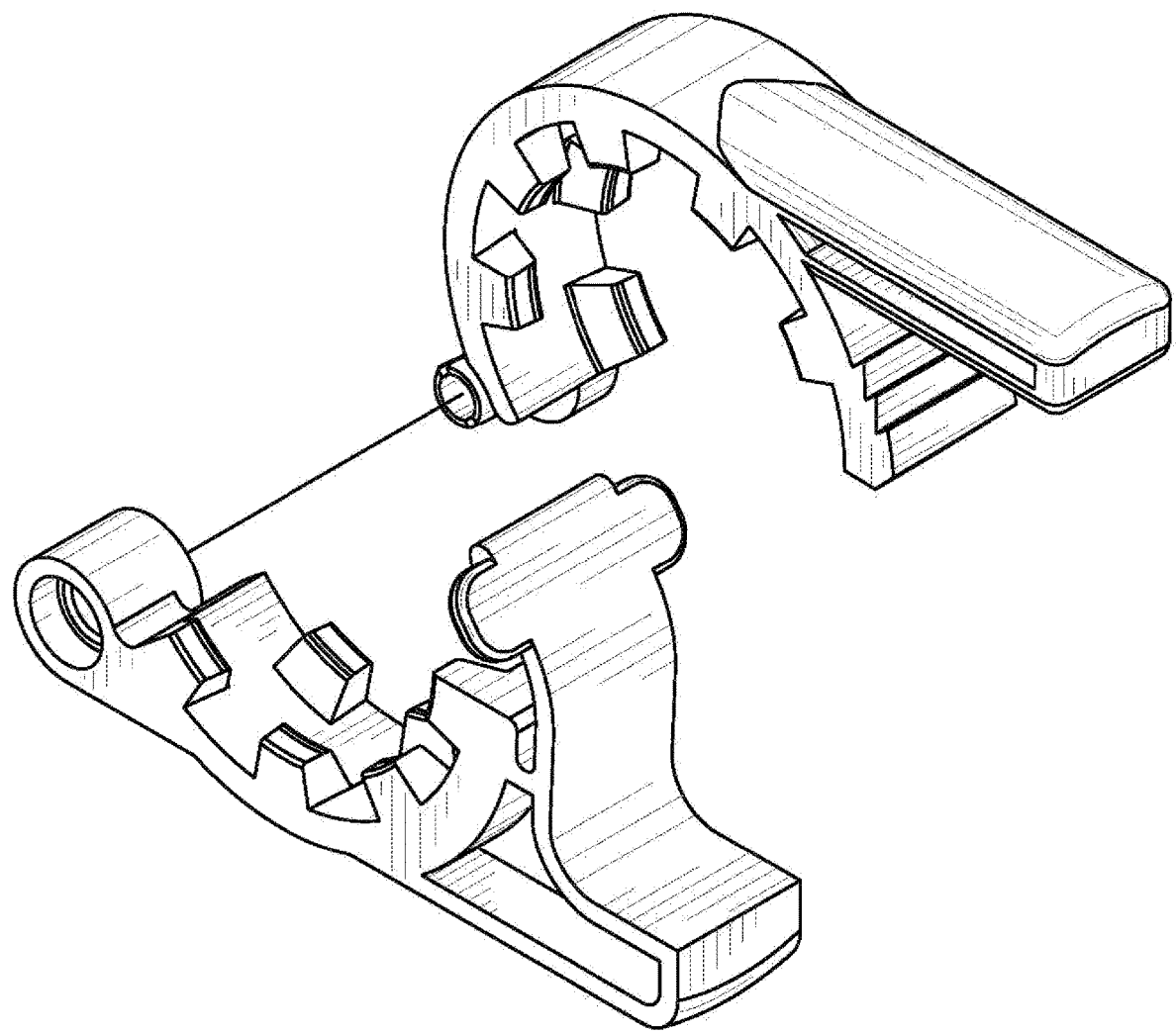
FIG. 26 is a top, left, back exploded perspective view of clamp 200.

FIG. 26 is a top, left, back exploded perspective view of clamp 200.

Figure 27:
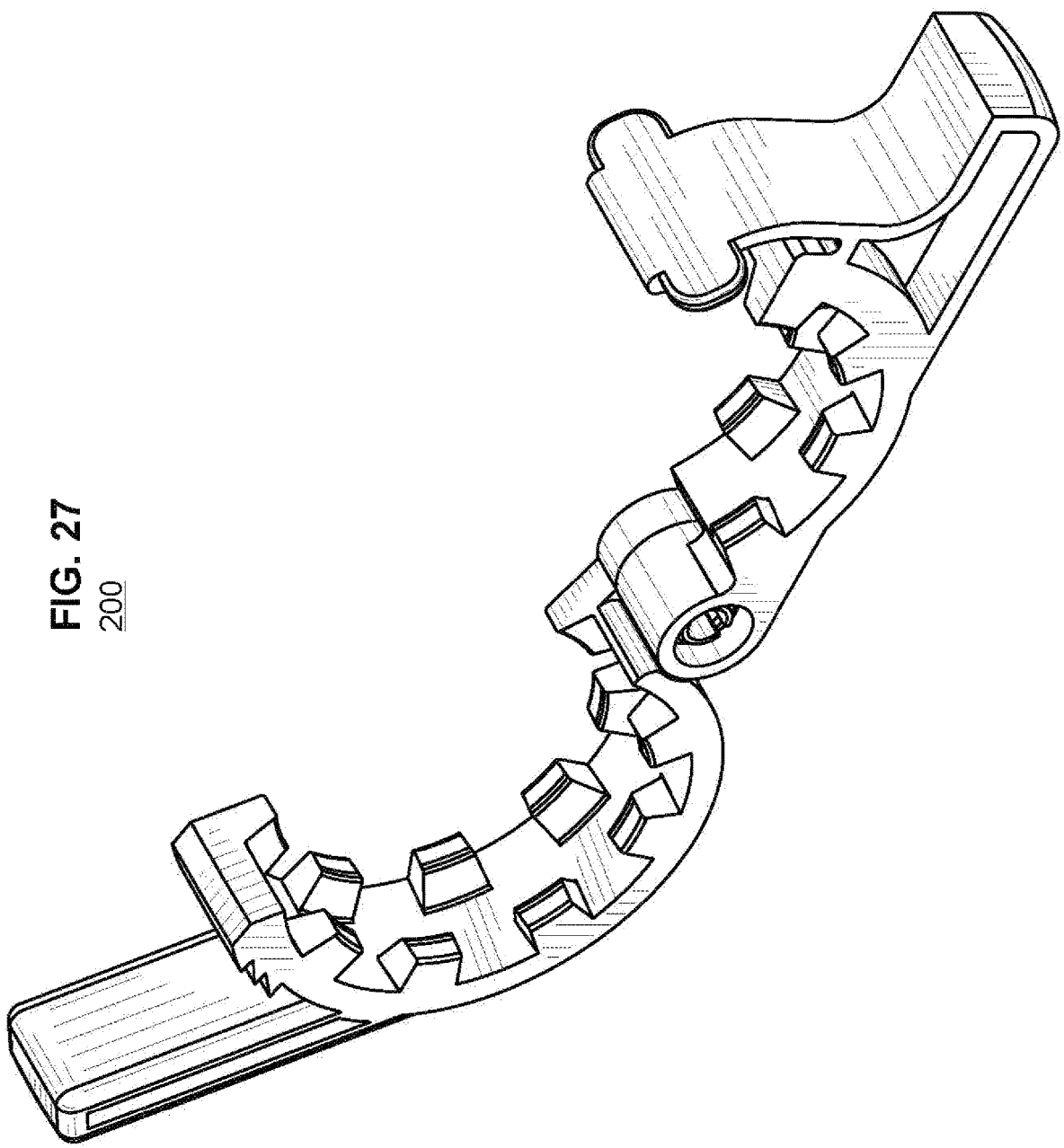
FIG. 27 is a top, left, back perspective view of clamp 200 in an open position.

FIG. 27 is a top, left, back perspective view of clamp 200 in an open position.

Figure 28:
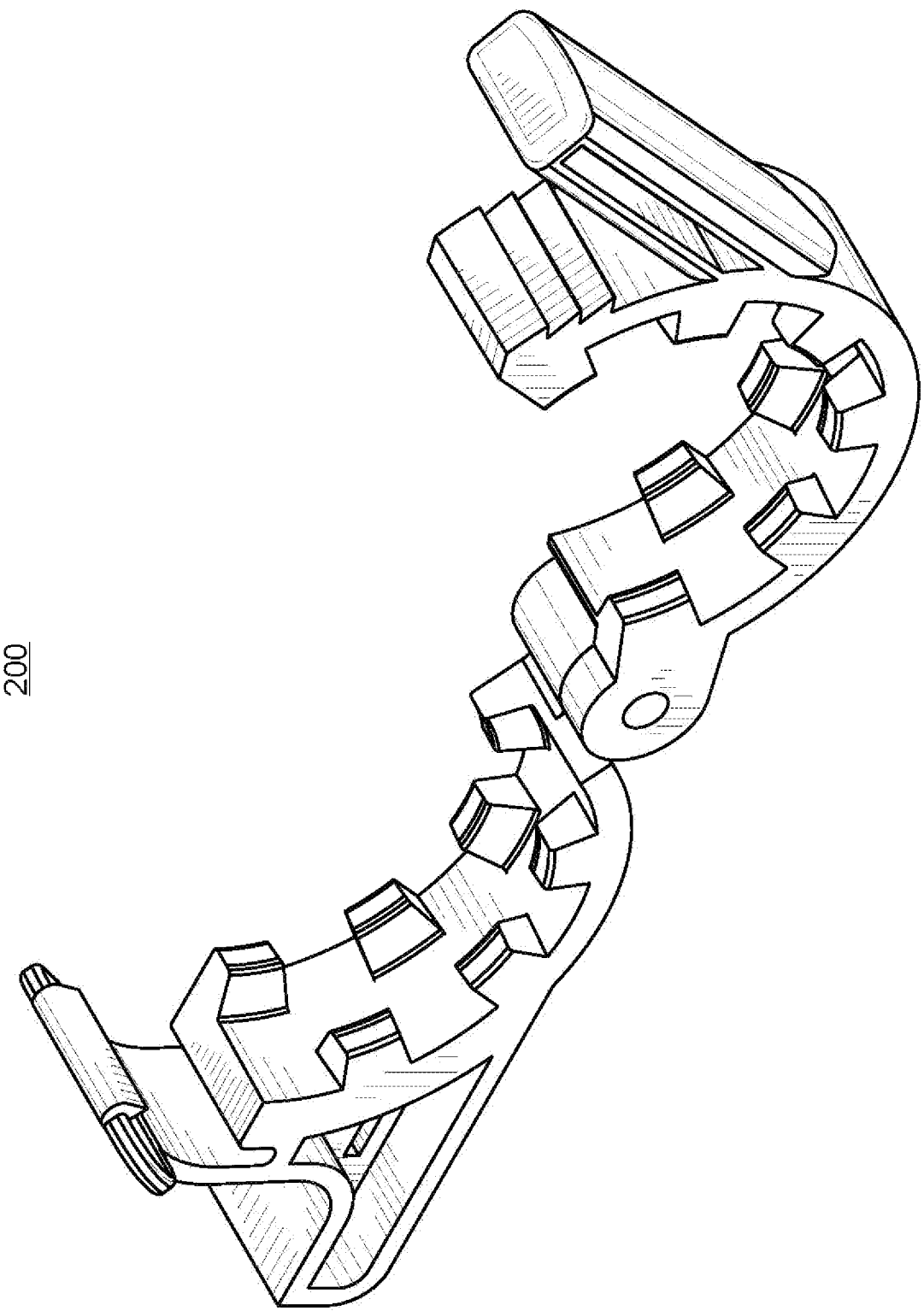
FIG. 28 is a top, right, front perspective view of clamp 200 in an open position.

FIG. 28 is a top, right, front perspective view of clamp 200 in an open position.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A clamp for use in a fluid flow system to hold a pair of flanges and a gasket in compression, the clamp comprising:
    a first clamp segment comprising:
        a first hinge portion at a first hinge end;
        a first locking portion at a first locking end;
    a second clamp segment comprising:
        a second hinge portion at a second hinge end;
        a second locking portion at a second locking end;
        the first hinge portion engaged with the second hinge portion to form a hinge connecting the first clamp segment to the second clamp segment;
        the first locking portion and the second locking portion adapted to form a reversible locking engagement so that the clamp can be moved from an unlocked status to a locked status;
        the first clamp segment is sized to allow a user to elastically deform to expand a first distance from the first hinge portion to the first locking portion to receive an arc of more than 180 degrees of perimeter of each of the pair of flanges; and
    wherein the arc is sufficiently more than 180 degrees of perimeter such that after receipt of more than 180 degrees of perimeter of the pair of flanges a removal force must be applied to elastically deform the first clamp segment to expand the first distance to allow for removal of the pair of flanges from the first clamp segment such that absent application of the removal force, the first clamp segment stays on the pair of flanges after release by the user;
    wherein the clamp has:
        a first set of teeth on a first side of the clamp for contacting a first flange in the pair of flanges;
        a second set of teeth on a second side of the clamp, opposite the first side of the clamp, for contacting a second flange in the pair of flanges; and
        the teeth in the first set of teeth are circumferentially offset from the teeth in the second set of teeth so that when viewed axially:
            the first set of teeth are in gaps between the second set of teeth; and
            the second set of teeth are in gaps between the first set of teeth.

2. The clamp of claim 1 wherein the first clamp segment sized to allow the user to elastically deform to expand the first distance from the first hinge portion to the first locking portion to receive more than 190 degrees of perimeter of each of the pair of flanges.

3. The clamp of claim 1 wherein the first clamp segment sized to allow the user to elastically deform to expand the first distance from the first hinge portion to the first locking portion to receive between 190 degrees and 245 degrees of perimeter of each of the pair of flanges.

4. The clamp of claim 3 wherein the first clamp segment sized to allow the user to elastically deform to expand the first distance from the first hinge portion to the first locking portion to receive between 220 degrees and 240 degrees of perimeter of each of the pair of flanges.

5. The clamp of claim 1 wherein the hinge is a snap fit hinge pin.

6. The clamp of claim 5 wherein the hinge pin is on the first clamp segment and a receiving ring is on the second clamp segment.

7. The clamp of claim 5 wherein the hinge pin is on the second clamp segment and a receiving ring is on the first clamp segment.

8. The clamp of claim 1 wherein the hinge is not a snap fit hinge pin.

9. The clamp of claim 1 wherein first hinge portion and the second hinge portion that form the hinge connecting the first clamp segment to the second clamp segment are a first portion of a living hinge and a second portion of a living hinge as the first clamp segment and second clamp segment are a single piece.

10. The clamp of claim 1 wherein the reversible locking engagement uses a pawl arm and a set of teeth.

11. The clamp of claim 10 wherein the pawl arm is on the second clamp segment and the set of teeth is on the first clamp segment.

12. The clamp of claim 10 wherein the pawl arm is on the first clamp segment and the set of teeth is on the second clamp segment.

13. An assembly comprising:
    the clamp of claim 1;
    a first flange;
    a second flange; and
    a first gasket located between the first flange and the second flange; and
    wherein more than 180 degrees of perimeter of the first flange and more than 180 degrees of perimeter of the second flange are within the first clamp segment and the first clamp segment is retained on the pair of flanges before the first locking portion of the first clamp segment and the second locking portion of the second clamp segment are placed into the reversible locking engagement.

14. The assembly of claim 13 wherein
    the first flange is a part of a first sanitary connector engaged with a first tube; and
    the second flange is a part of a second sanitary connector engaged with a second tube.

15. The assembly of claim 13 wherein:
    the first flange is part of a first sanitary connector engaged with a first tube; and
    the second flange is not connected to another sanitary connector but is used to cap the first flange and preclude fluid flow through the first sanitary connector.

16. The assembly of claim 13 wherein the gasket is an O-ring.

17. A process for applying a clamp with a first clamp segment and a second clamp segment to a pair of flanges for adjacent fluid flow elements;
    aligning a first flange with a second flange so that a centerline of the first flange is the centerline of the second flange to form the pair of flanges; and elastically deforming the first clamp segment and to capture into the first clamp segment an arc of more than 180 degrees of the pair of flanges;

the arc being sufficiently more than 180 degrees so that after capture of the arc of the pair of flanges, the first clamp segment cannot be disengaged from the pair of flanges without application of force to elastically deform the first clamp segment to expand sufficiently to allow a diameter of the pair of flanges to exit the first clamp segment while the first clamp segment is held in an elastically deformed state;

rotating the second clamp segment joined to the first clamp segment at a hinged connection so that additional portions of the pair of flanges are inserted into the second clamp segment; and forming a locked engagement of the first clamp segment to the second clamp segment using a first locking portion of the first clamp segment distal to the hinged connection and a second locking portion of the second clamp segment distal to the hinged connection;

wherein the first clamp segment has:
- a first set of teeth on a first side of the first clamp segment for contacting a first flange in the pair of flanges;
- a second set of teeth on a second side of the first clamp segment, opposite the first side of the first clamp segment, for contacting a second flange in the pair of flanges; and the teeth in the first set of teeth are circumferentially offset from the teeth in the second set of teeth so that when viewed axially:
- the first set of teeth are in gaps between the second set of teeth; and
- the second set of teeth are in gaps between the first set of teeth.

18. The process of claim 17 further comprising: using a locking device that is not part of the first clamp segment or the second clamp segment to engage with the first clamp segment and the second clamp segment to provide a secondary lock to preclude release of the locked engagement while the secondary lock is in effect.

19. The process of claim 17 wherein:
- the first flange is a part of a first sanitary connector engaged with a first section of tubing; and
- the second flange is a part of a secondary sanitary connector engaged with a second section of tubing.

20. The process of claim 17 wherein:
- the first flange is a part of a first sanitary connector engaged with a first section of tubing; and
- the second flange is a part of an end cap that is used to seal the first flange.

21. The process of claim 17 wherein a gasket is placed between the first flange and the second flange before completion of aligning the first flange with the second flange so that the centerline of the first flange is the centerline of the second flange.

* * * * *